(12) United States Patent
Jiang et al.

(10) Patent No.: US 10,897,312 B2
(45) Date of Patent: Jan. 19, 2021

(54) DATA TRANSMISSION METHOD, DEVICE, AND SYSTEM

(71) Applicant: Huawei Technologies Co., Ltd., Shenzhen (CN)

(72) Inventors: Tong Jiang, Beijing (CN); Pengfei Luo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/692,595

(22) Filed: Nov. 22, 2019

(65) Prior Publication Data

US 2020/0092007 A1    Mar. 19, 2020

Related U.S. Application Data

(63) Continuation of application No. PCT/CN2017/085564, filed on May 23, 2017.

(51) Int. Cl.
   *H04B 10/00*    (2013.01)
   *H04B 10/524*   (2013.01)
   *H04B 10/114*   (2013.01)
   *H04B 10/69*    (2013.01)

(52) U.S. Cl.
   CPC ....... *H04B 10/524* (2013.01); *H04B 10/1141* (2013.01); *H04B 10/691* (2013.01)

(58) Field of Classification Search
   CPC combination set(s) only.
   See application file for complete search history.

(56) References Cited

U.S. PATENT DOCUMENTS

| | | | |
|---|---|---|---|
| 9,369,235 B2 | 6/2016 | Hoffmann et al. | |
| 2008/0222482 A1 | 9/2008 | Ban | |
| 2010/0086064 A1 | 4/2010 | Jianming et al. | |
| 2011/0096861 A1 | 4/2011 | Green | |
| 2012/0224862 A1* | 9/2012 | Liu | H04L 27/2096 398/152 |

(Continued)

FOREIGN PATENT DOCUMENTS

| | | |
|---|---|---|
| CN | 1459186 A | 11/2003 |
| CN | 101262465 A | 9/2008 |

(Continued)

OTHER PUBLICATIONS

Draft D1 IEEE Std 802.15.7r1™-20xx, "IEEE Standard for Local and metropolitan area networks—Part 15.7: Short-Range Optical Wireless Communications," Oct. 2016, 634 pages.

*Primary Examiner* — Agustin Bello
(74) *Attorney, Agent, or Firm* — Conley Rose, P.C.

(57) ABSTRACT

A data transmission method, device, and system includes, when a preset condition is met, determining a quantity N of first symbols included in one first symbol group and a quantity K of bits transmitted in the first symbol group, where the preset condition is $\lfloor \log_2 m^N \rfloor > N \cdot \lfloor \log_2 m \rfloor$, $K = \lfloor \log_2 m^N \rfloor$, $m \geq 2$, $N \geq 2$, and $K \geq 3$; obtaining X data blocks, where each of the first X−1 data blocks includes K bits, the last data block includes Y bits, $X \geq 1$, and $K \geq Y \geq 1$; and processing each of the X data blocks into N first symbols to obtain NX first symbols, and sending the NX first symbols.

20 Claims, 7 Drawing Sheets

(56) References Cited

U.S. PATENT DOCUMENTS

| | | | |
|---|---|---|---|
| 2014/0308048 A1* | 10/2014 | Roberts | H04L 1/08 |
| | | | 398/187 |
| 2014/0328423 A1* | 11/2014 | Agee | H04W 52/241 |
| | | | 375/267 |
| 2015/0100845 A1* | 4/2015 | Myung | H03M 13/2703 |
| | | | 714/752 |
| 2015/0222392 A1 | 8/2015 | Hoffmann et al. | |
| 2015/0276399 A1 | 10/2015 | Breuer et al. | |
| 2015/0349871 A1* | 12/2015 | Baek | H04L 27/12 |
| | | | 375/267 |
| 2016/0323040 A1* | 11/2016 | Wood | H04B 10/616 |
| 2017/0111913 A1 | 4/2017 | Li et al. | |
| 2020/0092007 A1* | 3/2020 | Jiang | H04B 10/116 |

FOREIGN PATENT DOCUMENTS

| | | |
|---|---|---|
| CN | 101371542 A | 2/2009 |
| CN | 101394392 A | 3/2009 |
| CN | 101714962 A | 5/2010 |
| CN | 101986631 A | 3/2011 |
| CN | 101997802 A | 3/2011 |
| CN | 103973619 A | 8/2014 |
| CN | 105393621 A | 3/2016 |
| CN | 106338712 A | 1/2017 |
| KR | 101550376 B1 | 9/2015 |
| WO | 0223856 A2 | 3/2002 |
| WO | 2007081182 A1 | 7/2007 |

\* cited by examiner

DATA TRANSMISSION METHOD, DEVICE, AND SYSTEM

CROSS-REFERENCE TO RELATED APPLICATIONS

This application is a continuation application of International Application No. PCT/CN2017/085564, filed on May 23, 2017, the disclosure of which is hereby incorporated by reference in its entirety.

TECHNICAL FIELD

Embodiments of this application relate to the field of communications technologies, and in particular, to a data transmission method, device, and system.

BACKGROUND

Optical camera communications (OCC) may be implemented based on a light-emitting diode (LED) light source and a camera. In an OCC system, an LED may be used as a signal transmit end device to send an optical signal and a camera may be used as a signal receive end device to receive the optical signal, and convert the received optical signal into an electrical signal, to output the electrical signal.

Currently, a hot topic in the OCC system research field is how to ensure that flicker-free communication is implemented in a process of completing signal sending and receiving using a camera of a normal frame rate (for example, a frame rate of the camera is less than 60 frames per second (fps)). If a to-be-sent signal is modulated in an on-off keying (OOK) modulation scheme, according to the Nyquist sampling theorem, a signal sending frequency needs to be set to be less than half of a camera frame rate. In this way, the signal can be completely received. However, half of the camera frame rate is less than a flicker cut-off frequency of the naked eye at 100 hertz (Hz). Therefore, when the to-be-sent signal is modulated in the OOK modulation scheme, the human eye observes that an LED flickers.

To resolve the foregoing problem, in other approaches, a to-be-sent signal is modulated in an undersampled pulse width modulation (UPWM) scheme. Further, in the UPWM modulation scheme, a to-be-sent signal is modulated in a pulse width modulation scheme and a serial complementary pulse modulation scheme such that an LED light source sends a flicker-free 2-level optical signal. Correspondingly, a camera of the norm frame rate demodulates the optical signal received by the camera. In the method, flicker-free communication can be implemented, but a signal transmission rate is relatively low.

SUMMARY

This application provides a data transmission method, device, and system, to resolve a problem that a signal transmission rate is relatively low.

To achieve the foregoing objectives, the following technical solutions are used in this application:

According to a first aspect, a data transmission method is provided. The data $\lfloor \log_2 m^N \rfloor > N \cdot \lfloor \log_2 m \rfloor$ is met, a transmit end device determines a quantity N of first symbols included in one first symbol group and a quantity K of bits transmitted in the first symbol group. Herein, $m \geq 2$, $N \geq 2$, and $K \geq 3$. After the transmit end device obtains X data blocks that are obtained after to-be-transmitted data is grouped in a transmission sequence, the transmit end device processes each of the X data blocks into N first symbols in a first processing manner to obtain NX first symbols, and in this case, the transmit end device sends the NX first symbols to a receive end device; or after the transmit end device obtains X data blocks that are obtained after to-be-transmitted data is grouped in a transmission sequence, the transmit end device processes each of the first X−1 data blocks in the X data blocks into N first symbols in the first processing manner to obtain N(X−1) first symbols, and processes the last data block in the X data blocks into Z second symbols in a second processing manner, where $Z \geq 1$, and in this case, the transmit end device sends the N(X−1) first symbols and the Z second symbols to the receive end device. In the X data blocks obtained by the transmit end device, each of the first X−1 data blocks includes K bits, and the last data block includes Y bits, where $X \geq 1$ and $K \geq Y \geq 1$.

In this embodiment of this application, after obtaining the X data blocks, the transmit end device processes each data block into the N first symbols; or processes each of the first X−1 data blocks into the N first symbols, and processes the last data block into the Z second symbols. The transmit end device processes each data block, where each of the first X−1 data blocks includes K ($K = \lfloor \log_2 m^N \rfloor$) bits, and $\lfloor \log_2 m^N \rfloor > N \cdot \lfloor \log_2 m \rfloor$. Therefore, in this embodiment of this application, a quantity of bits transmitted in each first symbol group sent by the transmit device is greater than a quantity of bits transmitted in N symbols in other approaches, thereby improving a data transmission rate.

Further, the to-be-transmitted data in this embodiment of this application may be an optical signal, or may be an electrical signal. Therefore, a signal transmission rate can be improved in the data transmission method provided in this embodiment of this application.

In this embodiment of this application, the first processing manner may be the same as or different from the second processing manner. Further, when Y=K or when the first processing manner is the same as the second processing manner, the transmit end device processes each of the X data blocks into the N first symbols in the first processing manner. When $K > Y \geq 1$ or when the first processing manner is different from the second processing manner, the transmit end device processes each of the first X−1 data blocks in the X data blocks into the N first symbols in the first processing manner to obtain the N(X−1) first symbols, and processes the last data block in the X data blocks into the Z second symbols in the second processing manner.

Optionally, in a possible implementation of this application, a method for the "processing each of the X data blocks into N first symbols in a first processing manner" is, for each of the X data blocks, obtaining, based on a first preset mapping relationship, a first modulation parameter set corresponding to the data block, and generating the N first symbols based on the first modulation parameter set, where the first modulation parameter set includes N first modulation parameters, each first modulation parameter is used to generate one first symbol, and the first preset mapping relationship includes a one-to-one correspondence between $2^K$ different data blocks and $2^K$ of $m^N$ different first modulation parameter sets.

Optionally, in another possible implementation of this application, when $K > Y \geq 1$, a method for the "processing each of the X data blocks into N first symbols in a first processing manner" may be processing each of the first X−1 data blocks in the X data blocks into N first symbols in the first processing manner; adding K−Y preset bits to the last data block in the X data blocks; and processing, into N first symbols in the first processing manner, the last data block to which the K−Y preset bits are added.

Herein, the preset bit may be represented by 0, or may be represented by 1. When the quantity Y of bits included in the last data block is less than K, the transmit end device may directly add the K−Y preset bits to the last data block, and process, in the first processing manner, the last data block to which the preset bits are added. In this way, each data block can be processed in the first processing manner.

Optionally, in another possible implementation of this application, after the "processing, into N first symbols in the first processing manner, the last data block to which the K−Y preset bits are added", if $K-1 \le m^N - 2^K$, obtaining, in a third processing manner, N fourth symbols corresponding to K−Y and/or Y. In this case, a specific process of the "sending the NX first symbols to a receive end device" is sending the NX first symbols and the N fourth symbols to the receive end device, where the N fourth symbols are sent after the NX first symbols.

Optionally, in another possible implementation of this application, a method for the "obtaining, in a third processing manner, N fourth symbols corresponding to K−Y" is obtaining, based on a third preset mapping relationship, a third modulation parameter set corresponding to K−Y and/or Y, where the third modulation parameter set includes N third modulation parameters, each third modulation parameter is used to generate one four symbol, the third preset mapping relationship includes a one-to-one correspondence between K−1 different quantities of added bits and/or K−1 different quantities of extra bits and K−1 of $m^N$ different third modulation parameter sets, the third modulation parameter set in the third preset mapping relationship is different from the first modulation parameter set in the first preset mapping relationship, and the quantity of extra bits is a quantity of bits included in the last data block in the X data blocks; and generating the N fourth symbols based on the third modulation parameter set corresponding to K−Y and/or Y.

Optionally, in another possible implementation of this application, after the "processing, into N first symbols in the first processing manner, the last data block to which the K−Y preset bits are added", if $K-1 > m^N - 2^K$, obtaining, in a fourth processing manner, Q fourth symbols corresponding to K−Y and/or Y, where Q=N·i and i≥1. In this case, a process of the "sending the NX first symbols to a receive end device" is sending the NX first symbols and the Q fourth symbols to the receive end device, where the Q fourth symbols are sent after the Z second symbols.

Optionally, in another possible implementation of this application, a method for the "obtaining, in a fourth processing manner, Q fourth symbols corresponding to K−Y and/or Y" is obtaining, based on a fourth preset mapping relationship, a fourth modulation parameter group corresponding to K−Y and/or Y, where the fourth preset mapping relationship includes a one-to-one correspondence between K−1 different quantities of added bits and/or K−1 different quantities of extra bits and K−1 different fourth modulation parameter groups, each fourth modulation parameter group includes i fourth modulation parameter sets, each fourth modulation parameter set is one of $m^N$ different fourth modulation parameter sets, each fourth modulation parameter set includes N fourth modulation parameters, each fourth modulation parameter is used to generate one fourth symbol, each fourth modulation parameter group in the fourth preset mapping relationship includes at least one fourth modulation parameter set different from the first modulation parameter set in the first preset mapping relationship, and the quantity of extra bits is a quantity of bits included in the last data block in the X data blocks; and generating the Q fourth symbols based on a fourth modulation parameter group corresponding to K−Y and/or Y.

In the fourth preset relationship, if i>1, i fourth modulation parameter sets in one fourth modulation parameter group may be the same, or may not be completely the same, or may be completely different. This is not limited in this embodiment of this application.

It may be learned that the transmit end device may alternatively directly add a corresponding quantity of fourth symbols after the symbols corresponding to the last data block. In this way, after obtaining the fourth symbols, the receive end device can determine, based on the fourth symbols, that transmission of a frame ends, and can determine a quantity of extra bits based on the quantity of fourth symbols, thereby improving data transmission accuracy.

Optionally, in another possible implementation of this application, a method for the "sending the NX first symbols to a receive end device" is sending a frame to the receive end device, where the frame includes the NX first symbols and at least one third symbol, the at least one third symbol is obtained after characteristic information is modulated in a first preset modulation scheme, and the characteristic information includes at least one of N, m, and a quantity L of bits included in the to-be-transmitted data.

With reference to an existing frame structure, the characteristic information in this embodiment of this application may be information included in a frame header, or may be information indicated by a preamble sequence, or may be partially information included in the frame header and partially information indicated by the preamble sequence. The first preset modulation scheme is a modulation scheme on which the transmit end device and the receive end device agree.

When the characteristic information includes the quantity L of bits included in the to-be-transmitted data, the receive end device may determine to-be-transmitted bits based on L, thereby improving data transmission accuracy.

Optionally, in another possible implementation of this application, the characteristic information further includes first indication information, and the first indication information is used to indicate that each of the X data blocks is processed in the first processing manner.

When the characteristic information includes the first indication information, the receive end device may determine, based on the first indication information, a manner used to process the first symbol, to obtain a bit transmitted in the first symbol.

Optionally, in another possible implementation of this application, a method for the "processing each of the first X−1 data blocks in the X data blocks into N first symbols in the first processing manner, and processing the last data block in the X data blocks into Z second symbols in a second processing manner" is, for each of the first X−1 data blocks in the X data blocks, obtaining, based on a first preset mapping relationship, a first modulation parameter set corresponding to the data block, and generating the N first symbols based on the first modulation parameter set, where the first modulation parameter set includes N first modulation parameters, each first modulation parameter is used to generate one first symbol, and the first preset mapping relationship includes a one-to-one correspondence between $2^K$ different data blocks and $2^K$ of $m^N$ different first modulation parameter sets; and obtaining, based on a second preset mapping relationship, a second modulation parameter set corresponding to the last data block, and generating the Z second symbols based on the second modulation parameter set, where the second modulation parameter set includes Z second modulation parameters, each second modulation parameter is used to generate one second symbol, and the second preset mapping relationship includes a correspondence between the last data block and the second modulation parameter set; or modulating the last data block into the Z second symbols in a second preset modulation scheme.

When the first processing manner is the same as the second processing manner, a value of Z is the same as a value of N, in other words, Z=N. In addition, the first symbol and the second symbol are symbols of a same type, a quantity of bits transmitted in the first symbol is the same as a quantity of bits transmitted in the second symbol.

Optionally, in another possible implementation of this application, a method for the "sending the N(X−1) first symbols and the Z second symbols to the receive end device" is sending a frame to the receive end device, where the frame includes the N(X−1) first symbols, the Z second symbols, and at least one third symbol, the at least one third symbol is obtained after characteristic information is modulated in a first preset modulation scheme, and the characteristic information includes at least one of N, m, and a quantity L of bits included in the to-be-transmitted data.

The method for sending, by the transmit end device, the N(X−1) first symbols and the Z second symbols to the receive end device is similar to the method for sending, by the transmit end device, the NX first symbols to the receive end device.

Optionally, in another possible implementation of this application, the characteristic information further includes second indication information and third indication information, the second indication information is used to indicate that each of the first X−1 data blocks is processed in the first processing manner, and the third indication information is used to indicate that the last data block is processed in the second processing manner.

When the characteristic information includes the second indication information and the third indication information, the receive end device may determine, based on the second indication information, a processing manner used to process the first symbol, and determine, based on the third indication information, a processing manner used to process the second symbol. In this way, the receive end device can accurately obtain the to-be-transmitted data sent by the transmit end device.

Optionally, in another possible implementation of this application, when K>Y≥1, a method for the "processing the last data block in the X data blocks into Z second symbols in a second processing manner" may be adding P preset bits to the last data block, where K−Y≥P≥1; and processing, into the Z second symbols in the second processing manner, the last data block to which the P preset bits are added.

Herein, the preset bit may be represented by 0, or may be represented by 1. A value of P corresponds to the second processing manner. It may be learned that if the first processing manner is the same as the second processing manner, P=K−Y.

Optionally, in another possible implementation of this application, after the "processing, into the Z second symbols in the second processing manner, the last data block to which the P preset bits are added", if $K-1 \leq m^N - 2^K$, obtaining, in a third processing manner, N fourth symbols corresponding to P and/or Y. In this case, a specific process of the "sending the N(X−1) first symbols and the Z second symbols to the receive end device" is sending the N(X−1) first symbols, the Z second symbols, and the N fourth symbols to the receive end device, where the N fourth symbols are sent after the Z second symbols.

Herein, for a method for the "obtaining, in a third processing manner, N fourth symbols corresponding to P and/or Y", refer to the method for the "obtaining, in a third processing manner, N fourth symbols corresponding to K−Y".

Optionally, in another possible implementation of this application, after the "processing, into the Z second symbols in the second processing manner, the last data block to which the P preset bits are added", if $K-1 > m^K - 2^K$, obtaining, in a fourth processing manner, Q fourth symbols corresponding to P and/or Y, where Q=N·i and i≥1. In this case, a specific process of the "sending the N(X−1) first symbols and the Z second symbols to the receive end device" is sending the N(X−1) first symbols, the Z second symbols, and the Q fourth symbols to the receive end device, where the Q fourth symbols are sent after the Z second symbols.

Herein, for a method for the "obtaining, in a fourth processing manner, Q fourth symbols corresponding to P and/or Y", refer to the method for the "obtaining, in a fourth processing manner, Q fourth symbols corresponding to K−Y and/or Y".

According to a second aspect, a transmit end device is provided. The transmit end device includes a processing unit and a sending unit.

Functions implemented by the units provided in this application may be as follows:

The processing unit is configured to, when a preset condition is met, determine a quantity N of first symbols included in one first symbol group and a quantity K of bits transmitted in the first symbol group, where the preset condition is that $\lfloor \log_2 m^N \rfloor > N \cdot \lfloor \log_2 m \rfloor$, $K = \lfloor \log_2 m^N \rfloor$, m is a modulation order, m≥2, N≥2, and K≥3; configured to obtain X data blocks, where each of the first X−1 data blocks in the X data blocks includes K bits, the last data block in the X data blocks includes Y bits, X≥1, K≥Y≥1, and the X data blocks are obtained after to-be-transmitted data is grouped in a transmission sequence based on K; and configured to process each of the X data blocks into N first symbols in a first processing manner to obtain NX first symbols, or configured to process each of the first X−1 data blocks in the X data blocks into N first symbols in the first processing manner to obtain N(X−1) first symbols, and process the last data block in the X data blocks into Z second symbols in a second processing manner, where Z≥1. The sending unit is configured to send the NX first symbols to a receive end device after the processing unit obtains the NX first symbols; or configured to send the N(X−1) first symbols and the Z second symbols to the receive end device after the processing unit obtains the N(X−1) first symbols and the Z second symbols.

Further, in a possible implementation of this application, for each of the X data blocks, the processing unit is further configured to obtain, based on a first preset mapping relationship, a first modulation parameter set corresponding to the data block, and generate the N first symbols based on the first modulation parameter set, where the first modulation parameter set includes N first modulation parameters, each first modulation parameter is used to generate one first symbol, and the first preset mapping relationship includes a one-to-one correspondence between $2^K$ different data blocks and $2^K$ of $m^N$ different first modulation parameter sets.

Further, in another possible implementation of this application, when K>Y≥1, the processing unit is further configured to process each of the first X−1 data blocks in the X data blocks into N first symbols in the first processing manner; add K−Y preset bits to the last data block in the X data blocks; and process, into N first symbols in the first processing manner, the last data block to which the K−Y preset bits are added.

Further, in another possible implementation of this application, the processing unit is further configured to, after processing, into the N first symbols in the first processing manner, the last data block to which the K−Y preset bits are added, if $K-1 \leq m^N - 2^K$, obtain, in a third processing manner, N fourth symbols corresponding to K−Y and/or Y; and the sending unit is further configured to send the NX first symbols and the N fourth symbols to the receive end device, where the N fourth symbols are sent after the NX first symbols; or the processing unit is further configured to, after processing, into the N first symbols in the first processing manner, the last data block to which the K−Y preset bits are added, if $K-1 > m^K - 2^K$, obtain, in a fourth processing manner, Q fourth symbols corresponding to K−Y and/or Y, where Q=N·i and i≥1; and the sending unit is further configured to send the NX first symbols and the Q fourth symbols to the receive end device, where the Q fourth symbols are sent after the Z second symbols.

Further, in another possible implementation of this application, the processing unit is further configured to obtain, based on a third preset mapping relationship, a third modulation parameter set corresponding to K−Y and/or Y, where the third modulation parameter set includes N third modulation parameters, each third modulation parameter is used to generate one four symbol, the third preset mapping relationship includes a one-to-one correspondence between K−1 different quantities of added bits and/or K−1 different quantities of extra bits and K−1 of $m^N$ different third modulation parameter sets, the third modulation parameter set in the third preset mapping relationship is different from the first modulation parameter set in the first preset mapping relationship, and the quantity of extra bits is a quantity of bits included in the last data block in the X data blocks; and generate the N fourth symbols based on the third modulation parameter set corresponding to K−Y and/or Y; or the processing unit is further configured to obtain, based on a fourth preset mapping relationship, a fourth modulation parameter group corresponding to K−Y and/or Y, where the fourth preset mapping relationship includes a one-to-one correspondence between K−1 different quantities of added bits and/or K−1 different quantities of extra bits and K−1 different fourth modulation parameter groups, each fourth modulation parameter group includes i fourth modulation parameter sets, each fourth modulation parameter set is one of $m^N$ different fourth modulation parameter sets, each fourth modulation parameter set includes N fourth modulation parameters, each fourth modulation parameter is used to generate one fourth symbol, each fourth modulation parameter group in the fourth preset mapping relationship includes at least one fourth modulation parameter set different from the first modulation parameter set in the first preset mapping relationship, and the quantity of extra bits is a quantity of bits included in the last data block in the X data blocks; and generate the Q fourth symbols based on a fourth modulation parameter group corresponding to K−Y and/or Y.

Further, in another possible implementation of this application, the sending unit is further configured to send a frame to the receive end device after the processing unit obtains the NX first symbols, where the frame includes the NX first symbols and at least one third symbol, the at least one third symbol is obtained after characteristic information is modulated in a first preset modulation scheme, and the characteristic information includes at least one of N, m, and a quantity L of bits included in the to-be-transmitted data.

Further, in another possible implementation of this application, the processing unit is further configured to, for each of the first X−1 data blocks in the X data blocks, obtain, based on a first preset mapping relationship, a first modulation parameter set corresponding to the data block, and generate the N first symbols based on the first modulation parameter set, where the first modulation parameter set includes N first modulation parameters, each first modulation parameter is used to generate one first symbol, and the first preset mapping relationship includes a one-to-one correspondence between $2^K$ different data blocks and $2^K$ of $m^N$ different first modulation parameter sets; and obtain, based on a second preset mapping relationship, a second modulation parameter set corresponding to the last data block, and generate the Z second symbols based on the second modulation parameter set, where the second modulation parameter set includes Z second modulation parameters, each second modulation parameter is used to generate one second symbol, and the second preset mapping relationship includes a correspondence between the last data block and the second modulation parameter set; or modulate the last data block into the Z second symbols in a second preset modulation scheme.

Further, in another possible implementation of this application, the sending unit is further configured to send a frame to the receive end device, where the frame includes the N(X−1) first symbols, the Z second symbols, and at least one third symbol, the at least one third symbol is obtained after characteristic information is modulated in a first preset modulation scheme, and the characteristic information includes at least one of N, m, and a quantity L of bits included in the to-be-transmitted data.

Further, in another possible implementation of this application, when K>Y≥1, the processing unit is further configured to add P preset bits to the last data block, where K−Y≥P≥1; and process, into the Z second symbols in the second processing manner, the last data block to which the P preset bits are added.

According to a third aspect, a transmit end device is provided. The transmit end device includes a processor, a memory, and a communications interface. The memory is configured to store computer program code, the computer program code includes an instruction, and the processor, the communications interface, and the memory are connected using a bus. When the transmit end device runs, the processor executes the instruction stored in the memory, to enable the transmit end device to perform the data transmission method according to any one of the first aspect and the possible implementations of the first aspect.

According to a fourth aspect, a computer storage medium is provided. The computer storage medium stores computer program code. When the processor of the transmit end device in the third aspect executes the computer program code, the transmit end device performs the data transmission method according to any one of the first aspect and the possible implementations of the first aspect.

According to a fifth aspect, a computer program product including an instruction is further provided. When the instruction runs on a transmit end device, the transmit end device is enabled to perform the data transmission method according to any one of the first aspect and the possible implementations of the first aspect.

In this application, a name of the transmit end device constitutes no limitation on the device or the function modules. In an embodiment implementation, the device or the function modules may appear with other names. Various devices or function modules fall within the scope of the claims of this application and equivalent technologies of the claims, provided that functions of the various devices or function modules are similar to those in this application.

In this application, for detailed descriptions of the second aspect, the third aspect, the fourth aspect, the fifth aspect, and various implementations of the second aspect, the third aspect, the fourth aspect, and the fifth aspect, refer to the detailed descriptions of the first aspect and the various implementations of the first aspect; and for beneficial effects of the second aspect, the third aspect, the fourth aspect, the fifth aspect, and the various implementations of the second aspect, the third aspect, the fourth aspect, and the fifth aspect, refer to the analyses of the beneficial effects of the first aspect and the various implementations of the first aspect. Details are not described herein again.

According to a sixth aspect, a data transmission method is provided. The data transmission method is as follows. First, a receive end device receives a frame sent by a transmit end device, where the frame includes NX first symbols or includes N(X−1) first symbols and Z second symbols, the Z second symbols are transmitted after the N(X−1) first symbols, X≥1, N≥2, and Z≥1. Then, the receive end device obtains a modulation order m used by the transmit end device and a quantity N of symbols included in one first symbol group, where m≥2. Finally, the receive end device obtains X first symbol groups, and processes each of the X first symbol groups into K bits in a fifth processing manner to obtain KX bits, where K≥3, each of the X first symbol groups includes N first symbols, the X first symbol groups are obtained after the NX first symbols are grouped in a transmission sequence based on N, and the fifth processing manner is determined based on m; or the receive end device obtains X−1 first symbol groups, processes each of the X−1 first symbol groups into K bits in the fifth processing manner to obtain K(X−1) bits, where each of the X−1 first symbol groups includes N first symbols, and the X−1 first symbol groups are obtained after the N(X−1) first symbols are grouped in a transmission sequence based on N, and processes the Z second symbols into S bits in a sixth processing manner, where S≥1.

In this embodiment of this application, the receive end device processes, in a processing manner corresponding to the modulation order used by the transmit end device, symbols received by the receive end device. The receive end device and the transmit end device communicate with each other. With reference to the first aspect and the various possible implementations of the first aspect, it may be learned that a quantity of bits transmitted in the first symbol group in this embodiment of this application is greater than a quantity of bits transmitted in N symbols in other approaches. Therefore, a data transmission rate can be improved using the data transmission method provided in this application.

With reference to any one of the first aspect and the possible implementations of the first aspect, when K>Y≥1 and the transmit end device processes the last data block in the first processing manner, S=K in this embodiment of this application. When K>Y≥1, the transmit end device processes the last data block in the second processing manner, and the first processing manner is different from the second processing manner, S=Y+P in this embodiment of this application.

Optionally, in a possible implementation of this application, the receive end device further obtains, from the frame received by the receive end device, a quantity L of bits included in to-be-transmitted data, where L≥2. In this way, after the receive end device processes each of the X first symbol groups into the K bits in the fifth processing manner to obtain the KX bits, the receive end device further determines whether KX is greater than L; and when the receive end device determines that KX is greater than L, the receive end device deletes KX−L bits from the KX bits from back to front in a transmission sequence, and determines, as bits included in the to-be-transmitted data, bits remaining after the KX−L bits are deleted.

Optionally, in a possible implementation of this application, the receive end device further obtains, from the frame received by the receive end device, a quantity L of bits included in to-be-transmitted data. In this way, after the receive end device processes each of the X−1 symbol groups into the K bits in the fifth processing manner to obtain the K(X−1) bits and the receive end device processes the Z second symbols into the S bits in the sixth processing manner, the receive end device further determines whether K(X−1)+S is greater than L; and when the receive end device determines that K(X−1)+S is greater than L, the receive end device deletes K(X−1)+S−L bits from K(X−1)+S bits from back to front in a transmission sequence, and determines, as bits included in the to-be-transmitted data, bits remaining after the K(X−1)+S−L bits are deleted.

Optionally, in another possible implementation of this application, the frame received by the receive end device further includes at least one third symbol, and the at least one third symbol is obtained after the transmit end device modulates characteristic information in a first preset modulation scheme. The first preset modulation scheme is agreed on by the transmit end device and the receive end device. Therefore, after receiving the frame that includes the at least one third symbol, the receive end device demodulates each third symbol in a first preset demodulation scheme corresponding to the first preset modulation scheme, to obtain the characteristic information. Herein, the characteristic information includes at least one of N, L, and m. Optionally, the characteristic information may further include indication information. The indication information may be the first indication information described above, or may be the second indication information and the third indication information that are described above. Therefore, a method for obtaining, by the receive end device, the quantity L of bits included in the to-be-transmitted data sent by the transmit end device is as follows. The receive end device demodulates the at least one third symbol in the first preset demodulation scheme to obtain the characteristic information, and then the receive end device obtains L from the characteristic information.

Optionally, in another possible implementation of this application, the frame further includes N fourth symbols. In this case, the receive end device can determine, based on the N fourth symbols, that transmission of the frame ends; obtain a third demodulation parameter set corresponding to the N fourth symbols; and determine, based on a third preset mapping relationship, a quantity K−Y of added bits and/or a quantity Y of extra bits that corresponds to the third demodulation parameter set, where the third demodulation parameter set corresponding to the N fourth symbols includes N third demodulation parameters, each third demodulation parameter is used to demodulate one of the N fourth symbols, the third preset mapping relationship includes a one-to-one correspondence between K−1 different quantities of added bits and/or K−1 different quantities of extra bits and K−1 of $m^N$ different third demodulation parameter sets, the quantity of extra bits is a quantity of bits included in the last data block in the X data blocks, and K≥Y≥1. In this case, after processing each of the X first symbol groups into the K bits in the fifth processing manner to obtain the KX bits, the receive end device further deletes K−Y bits from the KX bits from back to front in a transmission sequence; and determines, as bits included in to-be-transmitted data, bits remaining after the K−Y bits are deleted.

Optionally, in another possible implementation of this application, the frame further includes N fourth symbols. In this case, the receive end device can determine, based on the N fourth symbols, that transmission of the frame ends; obtain a third demodulation parameter set corresponding to the N fourth symbols; and determine, based on a third preset mapping relationship, a quantity K−Y of added bits and/or a quantity Y of extra bits that corresponds to the third demodulation parameter set, where the third demodulation parameter set corresponding to the N fourth symbols includes N third demodulation parameters, each third demodulation parameter is used to demodulate one of the N fourth symbols, the third preset mapping relationship includes a one-to-one correspondence between K−1 different quantities of added bits and/or K−1 different quantities of extra bits and K−1 of $m^N$ different third demodulation parameter sets, the quantity of extra bits is a quantity of bits included in the last data block in the X data blocks, and K≥Y≥1. In this case, after processing each of the X−1 symbol groups into the K bits in the fifth processing manner to obtain the K(X−1) bits and processing the Z second symbols into the S bits in the sixth processing manner, the receive end device further deletes K−Y bits from K(X−1)+S bits from back to front in a transmission sequence; and determines, as bits included in to-be-transmitted data, bits remaining after the K−Y bits are deleted.

Optionally, in another possible implementation of this application, the frame further includes Q fourth symbols, Q=N·i, and i≥1. In this case, the receive end device can determine, based on the Q fourth symbols, that transmission of the frame ends; obtain a fourth demodulation parameter group corresponding to the Q fourth symbols; and determine, based on a fourth preset mapping relationship, a quantity K−Y of added bits and/or a quantity Y of extra bits that corresponds to the fourth demodulation parameter group, where the fourth demodulation parameter group corresponding to the Q fourth symbols includes i fourth demodulation parameter sets, each fourth demodulation parameter set includes N fourth demodulation parameters, each fourth demodulation parameter is used to demodulate one of the Q fourth symbols, the fourth preset mapping relationship includes a one-to-one correspondence between K−1 different quantities of added bits and/or K−1 different quantities of extra bits and K−1 different fourth demodulation parameter groups, the quantity of extra bits is a quantity of bits included in the last data block in the X data blocks, and K≥Y≥1. In this case, after processing each of the X first symbol groups into the K bits in the fifth processing manner to obtain the KX bits, the receive end device further deletes K−Y bits from the KX bits from back to front in a transmission sequence; and determines, as bits included in to-be-transmitted data, bits remaining after the K−Y bits are deleted.

Optionally, in another possible implementation of this application, the frame further includes Q fourth symbols, Q=N·j, and i≥1. In this case, the receive end device can determine, based on the Q fourth symbols, that transmission of the frame ends; obtain a fourth demodulation parameter group corresponding to the Q fourth symbols; and determine, based on a fourth preset mapping relationship, a quantity K−Y of added bits and/or a quantity Y of extra bits that corresponds to the fourth demodulation parameter group, where the fourth demodulation parameter group corresponding to the Q fourth symbols includes i fourth demodulation parameter sets, each fourth demodulation parameter set includes N fourth demodulation parameters, each fourth demodulation parameter is used to demodulate one of the Q fourth symbols, the fourth preset mapping relationship includes a one-to-one correspondence between K−1 different quantities of added bits and/or K−1 different quantities of extra bits and K−1 different fourth demodulation parameter groups, the quantity of extra bits is a quantity of bits included in the last data block in the X data blocks, and K≥Y≥1. In this case, after processing each of the X−1 symbol groups into the K bits in the fifth processing manner to obtain the K(X−1) bits and processing the Z second symbols into the S bits in the sixth processing manner, the receive end device further deletes K−Y bits from K(X−1)+S bits from back to front in a transmission sequence; and determines, as bits included in to-be-transmitted data, bits remaining after the K−Y bits are deleted.

Optionally, in another possible implementation of this application, a method for processing, by the receive end device, each of the X first symbol groups into the K bits in the fifth processing manner is, for each of the X first symbol groups, obtaining a first demodulation parameter set corresponding to the first symbol group, and obtaining, based on a first preset mapping relationship, the K bits corresponding to the first demodulation parameter set, where the first demodulation parameter set includes N first demodulation parameters, each first demodulation parameter is used to demodulate one first symbol, and the first preset mapping relationship includes a one-to-one correspondence between $2^K$ different data blocks and $2^K$ of $m^N$ different first demodulation parameter sets.

Optionally, in another possible implementation of this application, a method for processing, by the receive end device, each of the X−1 first symbol groups into the K bits in the fifth processing manner to obtain the K(X−1) bits and processing the Z second symbols into the S bits in the sixth processing manner is, for each of the X−1 first symbol groups, obtaining a first demodulation parameter set corresponding to the first symbol group, and obtaining, from the first preset mapping relationship, the K bits corresponding to the first demodulation parameter set, where the first demodulation parameter set includes N first demodulation parameters, each first demodulation parameter is used to demodulate one first symbol, and the first preset mapping relationship includes a one-to-one correspondence between $2^K$ different data blocks and $2^K$ of $m^N$ different first demodulation parameter sets; and obtaining a second demodulation parameter set corresponding to the Z second symbols, and obtaining, based on a second preset mapping relationship, the S bits corresponding to the second demodulation parameter set, where the second demodulation parameter set includes Z second demodulation parameters, each second demodulation parameter is used to demodulate one second symbol, and the second preset mapping relationship includes a correspondence between the second demodulation parameter set and the S bits; or demodulating the Z second symbols in a second preset demodulation scheme to obtain the S bits.

According to a seventh aspect, a receive end device is provided. The receive end device includes a receiving unit and a processing unit.

Functions implemented by the units provided in this application may be as follows:

The receiving unit is configured to receive a frame sent by a transmit end device, where the frame includes NX first symbols or the frame includes N(X−1) first symbols and Z second symbols, the Z second symbols are transmitted after the N(X−1) first symbols, X≥1, N≥2, and Z≥1. The processing unit is configured to obtain a modulation order m used by the transmit end device and a quantity N of symbols included in one first symbol group, where m≥2; and configured to obtain X first symbol groups, and process each of the X first symbol groups into K bits in a fifth processing manner to obtain KX bits, where K≥3, each of the X first symbol groups includes N first symbols, the X first symbol groups are obtained after the NX first symbols included in the frame received by the receiving unit are grouped in a transmission sequence based on N, and the fifth processing manner is determined based on m, or configured to obtain X−1 first symbol groups, process each of the X−1 first symbol groups into K bits in the fifth processing manner to obtain K(X−1) bits, where each of the X−1 first symbol groups includes N first symbols, and the X−1 first symbol groups are obtained after the N(X−1) first symbols are grouped in a transmission sequence based on N, and process the Z second symbols into S bits in a sixth processing manner, where S≥1.

Further, in a possible implementation of this application, the processing unit is further configured to obtain a quantity L of bits included in to-be-transmitted data, where the to-be-transmitted data is included in the frame, and L≥2; and after obtaining the KX bits, the processing unit is further configured to determine whether KX is greater than L; and when determining that KX is greater than L, delete KX−L bits from the KX bits from back to front in a transmission sequence, and determine, as bits included in the to-be-transmitted data, bits remaining after the KX−L bits are deleted; or after obtaining the K(X−1) bits and obtaining the S bits, the processing unit is further configured to determine whether K(X−1)+S is greater than L; and when determining that K(X−1)+S is greater than L, delete K(X−1)+S−L bits from K(X−1)+S bits from back to front in a transmission sequence, and determine, as bits included in the to-be-transmitted data, bits remaining after the K(X−1)+S−L bits are deleted.

Further, in a possible implementation of this application, the frame received by the receive end device further includes N fourth symbols, and the processing unit is further configured to determine, based on the N fourth symbols, that transmission of the frame ends; obtain a third demodulation parameter set corresponding to the N fourth symbols, where the third demodulation parameter set includes N third demodulation parameters, and each third demodulation parameter is used to demodulate one of the N fourth symbols; and determine, based on a third preset mapping relationship, a quantity K−Y of added bits and/or a quantity Y of extra bits that corresponds to the third demodulation parameter set, where the third preset mapping relationship includes a one-to-one correspondence between K−1 different quantities of added bits and/or K−1 different quantities of extra bits and K−1 of $m^N$ different third demodulation parameter sets, the quantity of extra bits is a quantity of bits included in the last data block in the X data blocks, and K≥Y≥1. Correspondingly, the processing unit is further configured to, after obtaining the KX bits, delete K−Y bits from the KX bits from back to front in a transmission sequence, and determine, as bits included in to-be-transmitted data, bits remaining after the K−Y bits are deleted; or is further configured to, after obtaining the K(X−1) bits and obtaining the S bits, delete K−Y bits from K(X−1)+S bits from back to front in a transmission sequence, and determine, as bits included in to-be-transmitted data, bits remaining after the K−Y bits are deleted.

Further, in a possible implementation of this application, the frame received by the receive end device further includes Q fourth symbols, Q=N·i, i≥1, and the processing unit is further configured to, determine, based on the Q fourth symbols, that transmission of the frame ends; obtain a fourth demodulation parameter group corresponding to the Q fourth symbols, where the fourth demodulation parameter group includes i fourth demodulation parameter sets, each fourth demodulation parameter set includes N fourth demodulation parameters, and each fourth demodulation parameter is used to demodulate one of the Q fourth symbols; and determine, based on a fourth preset mapping relationship, a quantity K−Y of added bits and/or a quantity Y of extra bits that corresponds to the fourth demodulation parameter group, where the fourth preset mapping relationship includes a one-to-one correspondence between K−1 different quantities of added bits and/or K−1 different quantities of extra bits and K−1 different fourth demodulation parameter groups, the quantity of extra bits is a quantity of bits included in the last data block in the X data blocks, and K≥Y≥1. Correspondingly, the processing unit is further configured to, after obtaining the KX bits, delete K−Y bits from the KX bits from back to front in a transmission sequence, and determine, as bits included in to-be-transmitted data, bits remaining after the K−Y bits are deleted; or is further configured to, after obtaining the K(X−1) bits and obtaining the S bits, delete K−Y bits from K(X−1)+S bits from back to front in a transmission sequence, and determine, as bits included in to-be-transmitted data, bits remaining after the K−Y bits are deleted.

Further, in a possible implementation of this application, the processing unit is further configured to, when obtaining the X first symbol groups, for each of the X first symbol groups, obtain a first demodulation parameter set corresponding to the first symbol group, and obtain, based on a first preset mapping relationship, the K bits corresponding to the first demodulation parameter set, where the first demodulation parameter set includes N first demodulation parameters, each first demodulation parameter is used to demodulate one first symbol, and the first preset mapping relationship includes a one-to-one correspondence between $2^K$ different data blocks and $2^K$ of $m^N$ different first demodulation parameter sets.

Further, in a possible implementation of this application, the processing unit is further configured to, when obtaining the K(X−1) bits and obtaining the S bits, for each of the X−1 first symbol groups, obtain a first demodulation parameter set corresponding to the first symbol group, and obtain, from the first preset mapping relationship, the K bits corresponding to the first demodulation parameter set, where the first demodulation parameter set includes N first demodulation parameters, each first demodulation parameter is used to demodulate one first symbol, and the first preset mapping relationship includes a one-to-one correspondence between $2^K$ different data blocks and $2^K$ of $m^N$ different first demodulation parameter sets; and obtain a second demodulation parameter set corresponding to the Z second symbols, and obtain, based on a second preset mapping relationship, the S bits corresponding to the second demodulation parameter set, where the second demodulation parameter set includes Z second demodulation parameters, each second demodulation parameter is used to demodulate one second symbol, and the second preset mapping relationship includes a correspondence between the second demodulation parameter set and the S bits; or demodulate the Z second symbols in a second preset demodulation scheme to obtain the S bits.

According to an eighth aspect, a receive end device is provided. The receive end device includes a processor, a memory, and a communications interface. The memory is configured to store computer program code, the computer program code includes an instruction, and the processor, the communications interface, and the memory are connected using a bus. When the receive end device runs, the processor executes the instruction stored in the memory, to enable the receive end device to perform the data transmission method according to any one of the sixth aspect and the possible implementations of the sixth aspect.

According to a ninth aspect, a computer storage medium is provided. The computer storage medium stores computer program code. When the processor of the receive end device in the eighth aspect executes the computer program code, the receive end device performs the data transmission method according to any one of the sixth aspect and the possible implementations of the sixth aspect.

According to a tenth aspect, a computer program product including an instruction is further provided. When the instruction runs on a receive end device, the receive end device is enabled to perform the data transmission method according to any one of the sixth aspect and the possible implementations of the sixth aspect.

In this application, a name of the receive end device constitutes no limitation on the device or the function modules. In an embodiment implementation, the device or the function modules may appear with other names. Various devices or function modules fall within the scope of the claims of this application and equivalent technologies of the claims, provided that functions of the various devices or function modules are similar to those in this application.

In this application, for detailed descriptions of the seventh aspect, the eighth aspect, the ninth aspect, the tenth aspect, and various implementations of the seventh aspect, the eighth aspect, the ninth aspect, and the tenth aspect, refer to the detailed descriptions of the sixth aspect and the various implementations of the sixth aspect; and for beneficial effects of the seventh aspect, the eighth aspect, the ninth aspect, the tenth aspect, and the various implementations of the seventh aspect, the eighth aspect, the ninth aspect, and the tenth aspect, refer to the analyses of the beneficial effects of the sixth aspect and the various implementations of the sixth aspect. Details are not described herein again.

According to an eleventh aspect, a data transmission system is further provided. The data transmission system includes at least one transmit end device according to the third aspect and at least one receive end device according to the eighth aspect.

These or other aspects of the embodiments of this application are more concise and understandable from the following descriptions.

DESCRIPTION OF EMBODIMENTS

In the specification, claims, and accompanying drawings of this application, the terms such as "first", "second", and "third" are intended to distinguish between different objects but do not limit a particular order.

In the embodiments of this application, the word such as "example" or "for example" is used to represent giving an example, an illustration, or a description. Any embodiment or design scheme described using the word such as "example" or "for example" in the embodiments of this application should not be explained as being more preferred or having more advantages than another embodiment or design scheme. Exactly, use of the word such as "example" or "for example" is intended to present a related concept in a specific manner.

To resolve a problem that a signal transmission rate is relatively low in an OCC system, the embodiments of this application provide a data transmission method. A transmit end device processes each of obtained X (X≥1) data blocks into N first symbols; or processes each of the first X−1 data blocks into N first symbols, and processes the last data block into Z second symbols. Each of the first X−1 data blocks includes K ($K=\lfloor \log_2 m^K \rfloor$) bits, and $\lfloor \log_2 m^N \rfloor > N \cdot \lfloor \log_2 m \rfloor$. Therefore, in the embodiments of this application, a quantity of bits transmitted in each first symbol group sent by the transmit device is greater than a quantity of bits transmitted in N symbols in other approaches, thereby improving a data transmission rate and spectral efficiency.

The symbol in the embodiments of this application may be a waveform, a status, a signal, or the like in an embodiment implementation.

Figure 1:
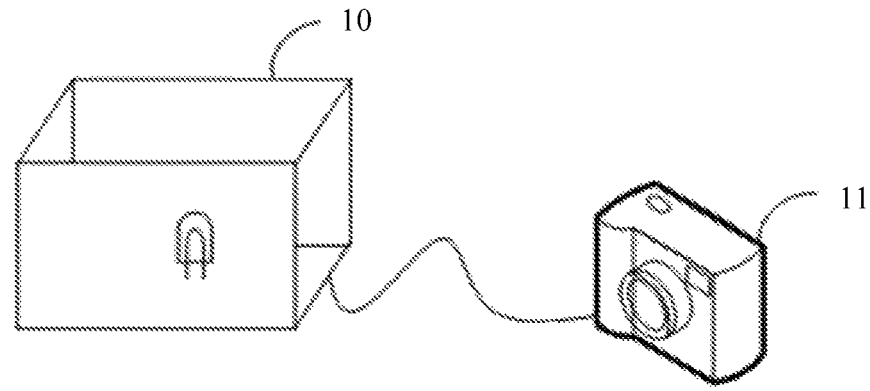
FIG. 1 is a schematic structural diagram of a data transmission system according to an embodiment of this application.

The data transmission method provided in the embodiments of this application is applicable to a data transmission system. For example, the data transmission system is an OCC system. FIG. 1 is a schematic structural diagram of a data transmission system according to an embodiment of this application. As shown in FIG. 1, the data transmission system includes a transmit end device 10 and a receive end device 11. The transmit end device 10 communicates with the receive end device 11. In an embodiment application, the transmit end device 10 may be connected to the receive end device 11 in a wireless or wired manner. For ease of intuitively representing a connection relationship between the transmit end device 10 and the receive end device 11, a solid line is used as in FIG. 1 for illustration.

In this embodiment of this application, both the transmit end device 10 and the receive end device 11 may be electronic devices. Optionally, in this embodiment of this application, the transmit end device 10 and the receive end device 11 may be independent of each other, or may be integrated into a same electronic device. The transmit end device 10 and the receive end device 11 that are shown in FIG. 1 are disposed independently of each other.

For example, the transmit end device 10 may be an electronic device that includes an LED lamp, and the receive end device 11 may be an electronic device in which a camera is built.

Further, the electronic device may be any device that has an image display function, such as a mobile phone, a camera, a wearable device, an augmented reality (AR) \virtual reality (VR) device, a tablet computer, a notebook computer, an ultra-mobile personal computer (UMPC), a netbook, or a personal digital assistant (PDA). This is not limited in this embodiment of this application.

Figure 2:
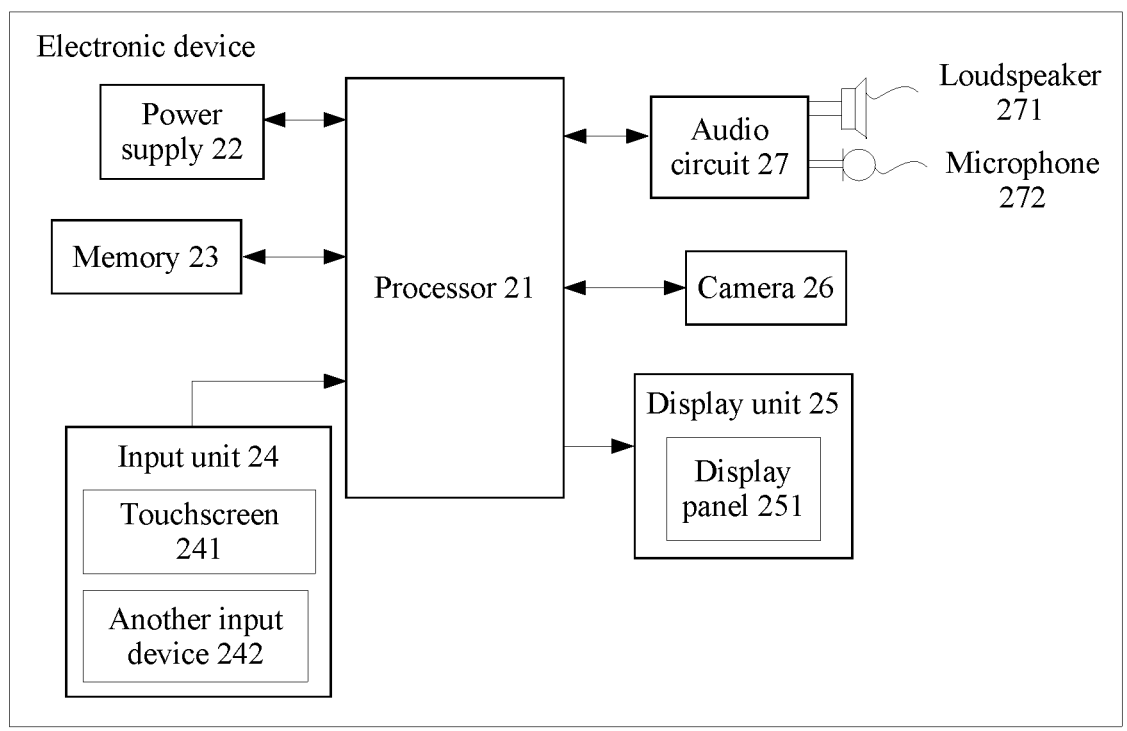
FIG. 2 is a schematic diagram of a hardware structure of an electronic device.

For a hardware structure of the electronic device in this embodiment of this application, refer to components of an electronic device shown in FIG. 2.

As shown in FIG. 2, the electronic device may further include components such as a processor 21, a power supply 22, a memory 23, an input unit 24, a display unit 25, a camera 26, and an audio circuit 27. A person skilled in the art may understand that a structure of the electronic device shown in FIG. 2 constitutes no limitation on the electronic device, and the electronic device may include more or fewer components than those shown in the figure, or have a combination of some components, or have a different component arrangement.

The following describes the components of the electronic device in detail with reference to FIG. 2.

The processor 21 is a control center of the electronic device, connects all parts of the entire electronic device using various interfaces and lines, and performs various functions of the electronic device and data processing by running or executing a software program and/or a module that are/is stored in the memory 23 and by invoking data stored in the memory 23, to overall monitor the electronic device. Optionally, the processor 21 may include one or more processing units. Preferably, an application processor and a modem processor may be integrated into the processor 21. The application processor mainly processes an operating system, a user interface, an application program, and the like, and the modem processor mainly processes wireless communication. It may be understood that the modem processor and the processor 21 may be alternatively independent of each other.

The electronic device includes the power supply 22 (such as a battery) that supplies power to the components. Optionally, the power supply 22 may be logically connected to the processor 21 using a power management system, to implement functions such as charging management, discharging management, and power consumption management using the power management system.

The memory 23 may be configured to store a software program and a module, and the processor 21 performs various function applications of the electronic device and data processing by running the software program and the module that are stored in the memory 23. The memory 23 may mainly include a program storage area and a data storage area. The program storage area may store an operating system, an application program required by at least one function (such as a data receiving function), and the like. The data storage area may store data (such as an image) created based on use of the electronic device, and the like. In addition, the memory 23 may include a high-speed random access memory, and may further include a nonvolatile memory, for example, at least one magnetic disk storage device, a flash storage device, or another volatile solid-state storage device.

The input unit 24 may be configured to receive entered digital or character information, and generate key signal input related to a user setting and function control of the electronic device. Further, the input unit 24 may include a touchscreen 241 and another input device 242. The touchscreen 241 is also referred to as a touch panel, and may collect a touch operation performed by a user on or near the touchscreen 241 (for example, an operation performed by the user on the touchscreen 241 or near the touchscreen 241 using any appropriate object such as a finger or a stylus), and drive a corresponding connected apparatus according to a preset program. Optionally, the touchscreen 241 may include two parts such as a touch detection apparatus and a touch controller. The touch detection apparatus detects a touch location of the user, detects a signal brought by a touch operation, and delivers the signal to the touch controller. The touch controller receives touch information from the touch detection apparatus, converts the touch information into touch point coordinates, and sends the touch point coordinates to the processor 21. In addition, the touch controller can receive and execute a command sent by the processor 21. In addition, the touchscreen 241 may be implemented in a plurality of types, for example, a resistive type, a capacitive type, an infrared type, and a surface acoustic wave type.

The display unit 25 may be configured to display information entered by the user or information provided for the user, and various menus of the electronic device. The display unit 25 may include a display panel 251. Optionally, the display panel 251 may be configured in a form of a liquid crystal display (LCD), an organic light-emitting diode (OLED), or the like. Further, the touchscreen 241 may cover the display panel 251. After detecting a touch operation performed on or near the touchscreen 241, the touchscreen 241 delivers the touch operation to the processor 21 to determine a type of a touch event, and then the processor 21 provides corresponding visual output on the display panel 251 based on the type of the touch event. Although in FIG. 2, the touchscreen 241 and the display panel 251 are used as two independent components to implement input and output functions of the electronic device, in some embodiments, the touchscreen 241 and the display panel 251 may be integrated to implement the input and output functions of the electronic device.

The camera 26 may also be used as an input device, and is further configured to convert a collected analog video or image signal into a digital signal, and then store the digital signal in the memory 23. Further, the camera 26 may include a front-facing camera, a rear-facing camera, a built-in camera, an external camera, and the like. This is not limited in this embodiment of this application.

The audio circuit 27 may include a loudspeaker 271 and a microphone 272, and is configured to provide an audio interface between the user and the electronic device. The audio circuit 27 may transmit an electrical signal converted from received audio data to the loudspeaker 271, and the loudspeaker 271 converts the electrical signal into a sound signal for outputting. In addition, the microphone 272 converts a collected sound signal into an electrical signal, and the audio circuit 27 converts the electrical signal into audio data after receiving the electrical signal, and then outputs the audio data to the memory 23 for further processing.

The following further explains the data transmission method provided in the embodiments of this application.

The data transmission method provided in the embodiments of this application may be applied to the data transmission system shown in FIG. 1. Specifically, for a transmit end device, the data transmission method provided in the embodiments of this application may be as follows:

(1) The transmit end device obtains X data blocks, where each of the X data blocks includes K bits. After obtaining the X data blocks, the transmit end device processes each of the X data blocks in a first processing manner.

Herein, the X data blocks are obtained after the transmit end device groups to-be-transmitted data in a transmission sequence based on a quantity K of bits transmitted in one first symbol group.

(2) The transmit end device obtains X data blocks, where each of the first X−1 data blocks in the X data blocks includes K bits, the last data block includes Y bits, and K>Y≥1. After obtaining the X data blocks, the transmit end device processes each of the first X−1 data blocks in the X data blocks in a first processing manner, and processes the last data block in the X data blocks in a second processing manner.

Herein, the X data blocks are also obtained after the transmit end device groups to-be-transmitted data in a transmission sequence based on a quantity K of bits transmitted in one first symbol group. Different from the method (1), in the method (2), a quantity of bits included in the last data block in the X data blocks is less than K.

In the method (2), the first processing manner may be the same as or different from the second processing manner.

It may be understood that, with reference to the method (1) and the method (2), a value range of Y in the embodiments of this application is K≥Y≥1.

Figure 3:
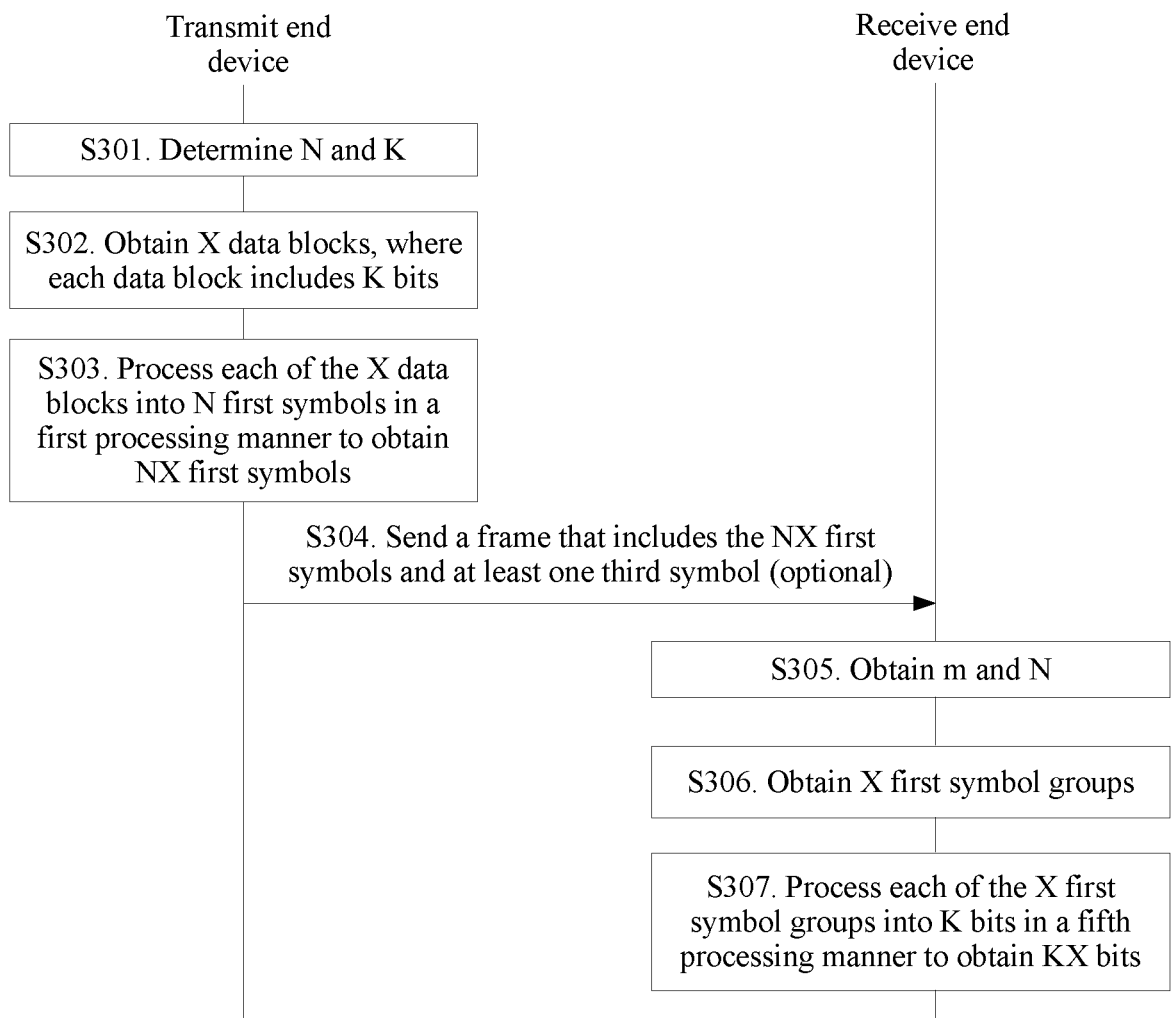
FIG. 3 is a schematic flowchart 1 of a data transmission method according to an embodiment of this application.

The method (1) is first described herein. As shown in FIG. 3, a data transmission method provided in an embodiment of this application includes the following steps.

S301. When a preset condition is met, a transmit end device determines a quantity N of first symbols included in one first symbol group and a quantity K of bits transmitted in the first symbol group.

The preset condition is that $\lfloor \log_2 m^N \rfloor > N \cdot \lfloor \log_2 m \rfloor$, $K = \lfloor \log_2 m^K \rfloor$, m≥2, N≥2, and K≥3. $\lfloor \cdot \rfloor$ represents rounding down. For example, $\lfloor 2.8 \rfloor = 2$ and $\lfloor 5.1 \rfloor = 5$.

m is a modulation order, and further, may be represented as a luminance order, or may be represented as a quantity of signal amplitudes, or may be represented as a quantity of different modulation parameters that can be used.

For example, for a UPWM signal, a value of the modulation order m is equal to a quantity of combinations that are of duty cycles and complementary duty cycles and that can be used to modulate to-be-modulated data, in other words, the modulation parameter m is a combination of a duty cycle and a complementary duty cycle. When m=3, combinations {duty cycles, complementary duty cycles} that are of duty cycles and complementary duty cycles and that are used to modulate the to-be-modulated data may be {25%, 75%}, {50%, 50%}, and {75%, 25%}. When a duty cycle is D, a complementary duty cycle is 1−D, and 1≥D≥0.

In this embodiment of this application, all symbols sent by the transmit end device may show same average luminance or a same average amplitude in an embodiment application, and luminance or amplitudes of different symbols received by a receive end device may be different, but should belong to m different luminance or amplitude intervals.

In a process of determining N, the transmit end device may select, as a value of N, a smallest value that meets the preset condition. For example, when m=3, $\lfloor \log_2 2^N \rfloor > N \cdot \lfloor \log_2 3 \rfloor$, and the transmit end device determines that N=2. Correspondingly, $K = \lfloor \log_2 3^2 \rfloor = 3$. Likewise, when m=6, N=2 and K=5.

Optionally, the value of m and the value of N may be preconfigured, in other words, both the value of m and the value of N remain unchanged. Correspondingly, a value of K is also preconfigured. In this way, the transmit end device can directly complete subsequent processing using preconfigured N and K.

Optionally, when the value of m and the value of N are preconfigured, the transmit end device may calculate K based on preconfigured m and N.

Optionally, the value of m and the value of N may be determined by the transmit end device based on a measurement parameter sent by the receive end device, and the measurement parameter may include at least one of parameters such as a received signal-to-noise ratio, a bit error rate, and a sounding signal of the receive end device. For example, the receive end device sends a sounding signal to the transmit end device. After receiving the sounding signal, the transmit end device calculates a distance between the transmit end device and the receive end device based on the sounding signal. When the distance between the transmit end device and the receive end device is less than or equal to 3 meters, the transmit end device determines that m=6 and N=2. When the distance between the transmit end device and the receive end device is greater than 3 meters, the transmit end device determines that m=3 and N=2.

S302. The transmit end device obtains X data blocks, where each of the X data blocks includes K bits.

Further, the transmit end device groups to-be-transmitted data in a transmission sequence based on K to obtain the X data blocks.

For example, the to-be-transmitted data includes X K bits. Based on the transmission sequence of the to-be-transmitted data, the transmit end device determines the first bit to the $K^{th}$ bit in the to-be-transmitted data as the first data block, and determines the $(K+1)^{th}$ bit to the $(2K)^{th}$ bit as the second data block. The to-be-transmitted data is grouped in this sequence until there is no remaining bit. For example, when m=6, N=2, and K=5, if the to-be-transmitted data is {01001011100110011101}, the transmit end device may obtain X=4 data blocks in a transmission sequence (from left to right) based on K=5, where the four data blocks are {01001}, {01110}, {01100}, and {11101}. The four data blocks are obtained after the transmit end device groups the to-be-transmitted data in the transmission sequence. Therefore, {11101} is the last data block in the four data blocks.

In an embodiment implementation, the to-be-transmitted data in this embodiment of this application may be content in a frame header in a frame structure, or may be content in a payload in the frame structure, or may be content in the frame header and in the payload in the frame structure.

S303. The transmit end device processes each of the X data blocks into N first symbols in a first processing manner to obtain NX first symbols.

Further, for each of the X data blocks, for example, for a first data block, the transmit end device obtains, based on a first preset mapping relationship, a first modulation parameter set corresponding to the first data block, and generates N first symbols based on the obtained first modulation parameter set.

The first preset mapping relationship includes a one-to-one correspondence between $2^K$ different data blocks and $2^K$ of $m^N$ different first modulation parameter sets. Each first modulation parameter set in the first preset mapping relationship includes N first modulation parameters. Each first modulation parameter in each first modulation parameter set is used to generate one first symbol. Each of the $2^K$ different data blocks includes K bits. For the first data block, the first preset mapping relationship includes a correspondence between the first data block and the first modulation parameter set corresponding to the first data block.

For example, the first modulation parameter in this embodiment of this application may be duty cycle information and complementary duty cycle information. A sum of a duty cycle and a complementary duty cycle is 1. The transmit end device may generate N first symbols based on the obtained duty cycle information and complementary duty cycle information according to a waveform generation method in a UPWM modulation scheme.

It can be learned from S301 that when m=6, N=2 and K=5. For example, Table 1 shows a first preset mapping relationship in a case in which m=6, N=2, and K=5.

TABLE 1

| Data block information (+complementary duty cycle information) | Symbol I Duty cycle information (+complementary duty cycle information) | Symbol II Duty cycle |
|---|---|---|
| 00000 | 15% (+85%) | 15% (+85%) |
| 00001 | 15% (+85%) | 30% (+70%) |
| 00010 | 15% (+85%) | 45% (+55%) |
| 00011 | 15% (+85%) | 60% (+40%) |
| 00100 | 15% (+85%) | 75% (+25%) |
| 00101 | 15% (+85%) | 90% (+10%) |
| 00110 | 30% (+70%) | 15% (+85%) |
| 00111 | 30% (+70%) | 30% (+70%) |
| 01000 | 30% (+70%) | 45% (+55%) |
| 01001 | 30% (+70%) | 60% (+40%) |
| 01010 | 30% (+70%) | 75% (+25%) |
| 01011 | 30% (+70%) | 90% (+10%) |
| 01100 | 45% (+55%) | 15% (+85%) |
| 01101 | 45% (+55%) | 30% (+70%) |
| 01110 | 45% (+55%) | 45% (+55%) |
| 01111 | 45% (+55%) | 60% (+40%) |
| — | 90% (+10%) | 45% (+55%) |
| — | 90% (+10%) | 60% (+40%) |
| 10000 | 45% (+55%) | 75% (+25%) |
| 10001 | 45% (+55%) | 90% (+10%) |
| 10010 | 60% (+40%) | 15% (+85%) |
| 10011 | 60% (+40%) | 30% (+70%) |
| 10100 | 60% (+40%) | 45% (+55%) |
| 10101 | 60% (+40%) | 60% (+40%) |
| 10110 | 60% (+40%) | 75% (+25%) |
| 10111 | 60% (+40%) | 90% (+10%) |
| 11000 | 75% (+25%) | 15% (+85%) |
| 11001 | 75% (+25%) | 30% (+70%) |
| 11010 | 75% (+25%) | 45% (+55%) |
| 11011 | 75% (+25%) | 60% (+40%) |
| 11100 | 75% (+25%) | 75% (+25%) |
| 11101 | 75% (+25%) | 90% (+10%) |
| 11110 | 90% (+10%) | 15% (+85%) |
| 11111 | 90% (+10%) | 30% (+70%) |
| — | 90% (+10%) | 75% (+25%) |
| — | 90% (+10%) | 90% (+10%) |

In Table 1, a first modulation parameter set corresponding to each data block is duty cycle information and complementary duty cycle information of a pulse width modulation (PWM) signal used in a symbol I and/or a symbol II, and the symbol I and the symbol II are two adjacent symbols. There are four types of extra duty cycle information and complementary duty cycle information in Table 1.

For example, if bits included in the first data block are represented as "00111", the transmit end device finds, in Table 1, that duty cycle information and complementary duty cycle information that correspond to "00111" are "30% (+70%)" and "30% (+70%)", and the transmit end device generates a symbol I based on "30% (+70%)" according to the waveform generation method in the UPWM modulation scheme, and generates a symbol II based on "30% (+70%)" according to the waveform generation method in the UPWM modulation scheme.

With reference to the foregoing example, a method for generating, by the transmit end device, the symbol I based on "30% (+70%)" according to the waveform generation method in the UPWM modulation scheme is as follows. The transmit end device generates k PWM waveforms, each with a duty cycle of 30%, and generates k PWM waveforms, each with a duty cycle of 70%. Total duration of each of the two types of PWM waveforms is Tc/2, and Tc is symbol duration. Maximum duration of each PWM waveform in the two types of PWM waveforms is less than or equal to preset time. An absolute value of a duration difference between any two adjacent PWM waveforms whose duty cycles are 30% and 70% is less than or equal to a first threshold (for example, the first threshold is 0.0002s). Any Tc moment needs to include a Tc/2 PWM waveform whose duty cycle is 30% and a Tc/2 PWM waveform whose duty cycle is 70% (for example, any 10 ms needs to include a 5 ms PWM waveform whose duty cycle is 30% and a 5 ms PWM waveform whose duty cycle is 70%). The transmit end device forms a UPWM waveform using the plurality of PWM waveforms in a sequence of $(k_1, 30\%)$, $(k_1, 70\%)$, $(k_2, 30\%)$, $(k_2, 70\%)$, ..., $(k_k, 30\%)$, and $(k_k, 70\%)$, where $(k_1, 30\%)$ indicates the sent $k_{1th}$ PWM waveform whose duty cycle is 30%, and $(k_k, 70\%)$ indicates the last PWM waveform whose duty cycle is 70%.

In the foregoing example, a method for generating, by the transmit end device, the symbol II based on "30% (+70%)" according to the waveform generation method in the UPWM modulation scheme is similar to the method for generating, by the transmit end device, the symbol I based on "30% (+70%)" according to the waveform generation method in the UPWM modulation scheme, and details are not described herein.

Certainly, the first modulation parameter in this embodiment of this application may alternatively include only the duty cycle information. After obtaining the duty cycle information, the transmit end device may obtain the complementary duty cycle information through calculation. The first modulation parameter may be alternatively another parameter that can be used to modulate a data block. This is not limited in this embodiment of this application.

S304. The transmit end device sends, to the receive end device, a frame that includes the NX first symbols and at least one third symbol (optional).

After obtaining the NX first symbols, the transmit end device sends the NX first symbols to the receive end device. Further, the transmit end device sends, to the receive end device, the frame that includes the NX first symbols and the at least one third symbol.

With reference to an existing frame structure, the NX first symbols in this embodiment of this application may be information included in a frame header, or may be information included in a payload, or may be information included in the frame header and in the payload.

The at least one third symbol is obtained after the transmit end device modulates characteristic information in a first preset modulation scheme. The first preset modulation scheme is a modulation scheme on which the transmit end device and the receive end device agree. The characteristic information includes at least one of N, m, and a quantity L of bits included in the to-be-transmitted data, where L≥2.

The first preset modulation scheme in this embodiment of this application may be any existing modulation scheme, such as a UPWM modulation scheme.

With reference to the existing frame structure, the characteristic information in this embodiment of this application may be information included in the frame header, or may be information indicated by a preamble sequence, or may be partially information included in the frame header and partially information indicated by the preamble sequence.

It may be understood that if the characteristic information is the information included in the frame header, the characteristic information in this embodiment of this application may further include other information in the frame header in addition to at least one of N, m, and L. Likewise, if the characteristic information is the information indicated by the preamble sequence, the characteristic information in this embodiment of this application may further include other information indicated by the preamble sequence in addition to at least one of N, m, and L.

Further, the characteristic information further includes first indication information, and the first indication information is used to indicate that each of the X data blocks is processed in the first processing manner. In this way, the receive end device can process the NX first symbols in a fifth processing manner based on the first indication information.

Optionally, the transmit end device and the receive end device may pre-agree that each data block is processed in the first processing manner. In this way, the characteristic information does not need to include the first indication information, thereby reducing signaling overheads.

With reference to the descriptions in S301, the value of m may remain unchanged, in other words, the value of m may be pre-agreed on by the transmit end device and the receive end device. In this way, the value of N also remains unchanged. In this case, the characteristic information may include only L and the first indication information, or include only L, or include neither L nor the first indication information.

It should be noted that, when the characteristic information includes neither L nor the first indication information, the frame sent by the transmit end device to the receive end device does not include the third symbol. Therefore, the third symbol is optional in this embodiment of this application.

Optionally, when the characteristic information does not include L, the transmit end device may send L to the receive end device in another manner. For example, when characteristic information that includes m and N is information indicated by a preamble sequence, the transmit end device may add L to other information carried in a frame header of the frame, where L is used to indicate a length of a payload of the frame, the frame header may be processed in the first processing manner, and a length of the frame header is pre-agreed on by the transmit end device and the receive end device.

S305. The receive end device obtains the modulation order m used by the transmit end device and the quantity N of symbols included in one first symbol group.

Optionally, in S304, the transmit end device sends, to the receive end device, the frame that includes the NX first symbols and the at least one third symbol (optional). Correspondingly, the receive end device may receive the frame that includes the NX first symbols and the at least one third symbol (optional).

Further, when the transmit end device sends the frame that includes the NX first symbols and the at least one third symbol, after receiving the frame that includes the NX first symbols and the at least one third symbol, the receive end device demodulates the first symbols and the third symbol. In a process of demodulating the third symbol, the receive end device obtains the modulation order m used by the transmit end device and the quantity N of symbols included in one first symbol group.

It may be learned from the foregoing descriptions that the at least one third symbol is obtained after the transmit end device modulates the characteristic information in the first preset modulation scheme, and the first preset modulation scheme is a modulation scheme agreed on by the transmit end device and the receive end device. Therefore, the receive end device demodulates the at least one third symbol in a first preset demodulation scheme to obtain the characteristic information. In this way, the receive end device can obtain m and N from the characteristic information.

Further, if the characteristic information further includes L, the receive end device may further obtain L from the characteristic information.

Further, if the characteristic information further includes the first indication information, the receive end device may further obtain the first indication information from the characteristic information. In this way, the receive end device can determine, based on the first indication information, to process the NX first symbols in the fifth processing manner. It may be understood that a process in which the receive end device processes the NX first symbols in the fifth processing manner is a reverse process of a process in which the transmit end device processes the X data blocks in the first processing manner.

Optionally, if the value of m is agreed on by the transmit end device and the receive end device, and the value of N remains unchanged, the receive end device may directly obtain m and N, without obtaining m and N in the process of demodulating the third symbol.

Further, if the characteristic information further includes L, the receive end device may further obtain L from the characteristic information. If a value of L is also pre-agreed on by the transmit end device and the receive end device, the receive end device may also directly obtain L. In this case, the transmit end device sends, to the receive end device, a frame that includes the NX first symbols. In this case, the receive end device receives the frame that includes the NX first symbols.

S306. The receive end device obtains X first symbol groups.

Further, the receive end device groups the NX first symbols in a transmission sequence based on N to obtain the X first symbol groups, where each of the X first symbol groups includes N first symbols.

Optionally, before obtaining the X first symbol groups, the receive end device may determine the value of K based on the value of m and the value of N, and then determine a value of X based on the obtained value of L.

In an embodiment application, if the receive end device receives, through photographing, a signal sent by the transmit end device, the receive end device may detect a luminance signal from a photographed video frame, for example, an RGB (Red Green Blue, red green blue) value obtained after luminance of an optical signal is quantized. To be specific, for the receive end device, each symbol corresponds to one first RGB value, and after the first RGB value is obtained, each symbol corresponds to one percentage after processing such as non-linear compensation, normalization, possible phase compensation, and percentage decision is performed on the first RGB value. In this way, a process in which the receive end device obtains the X first symbol groups is actually a process in which the receive end device obtains X percentage sets, and the X percentage sets are in a one-to-one correspondence with the X first symbol groups. Each percentage set includes N percentages.

S307. The receive end device processes each of the X first symbol groups into K bits in the fifth processing manner to obtain KX bits.

Further, the receive end device determines, based on m or based on m and N, to obtain, using a first preset mapping relationship, the bits corresponding to the symbol groups. For each of the X first symbol groups, the receive end device obtains a first demodulation parameter set corresponding to the first symbol group, and obtains, based on the determined first preset mapping relationship, the K bits corresponding to the first demodulation parameter set.

The first preset mapping relationship is the same as the first preset mapping relationship used by the transmit end device. It is easy to understand that, for the transmit end device, a first modulation parameter set corresponding to K bits is obtained based on the K bits and the first preset mapping relationship, and for the receive end device, K bits corresponding to a first demodulation parameter set are obtained based on the first demodulation parameter set and the first preset mapping relationship.

With reference to S306, it may be learned that the receive end device may obtain the percentage sets. Each percentage in each percentage set corresponds to one first demodulation parameter.

It may be learned from the foregoing descriptions that when the first modulation parameter is duty cycle information and complementary duty cycle information, both the duty cycle information and the complementary duty cycle information may be represented as percentages. After obtaining the percentage sets, the receive end device may calculate a complementary percentage of each percentage in the percentage sets (a sum of the complementary percentage and the corresponding percentage is 1). In this way, each first demodulation parameter obtained by the receive end device includes one percentage and a complementary percentage corresponding to the percentage.

The transmit end device processes each data block, where each data block includes K (K−$\lfloor \log_2 m^N \rfloor$) bits, and $\lfloor \log_2 m^N \rfloor \leq N \cdot \lfloor \log_2 m \rfloor$. Therefore, in this embodiment of this application, a quantity of bits transmitted in each first symbol group sent by the transmit device is greater than a quantity of bits transmitted in N symbols in other approaches, thereby improving a data transmission rate and spectral efficiency.

The method (2) is now described. The embodiments of this application are first described using an example in which a transmit end device processes each of the first X−1 data blocks in X data blocks in a first processing manner, and processes the last data block in the X data blocks in a second processing manner, where the second processing manner is a second preset modulation scheme, and the first processing manner is different from the second preset modulation scheme.

Figure 4:
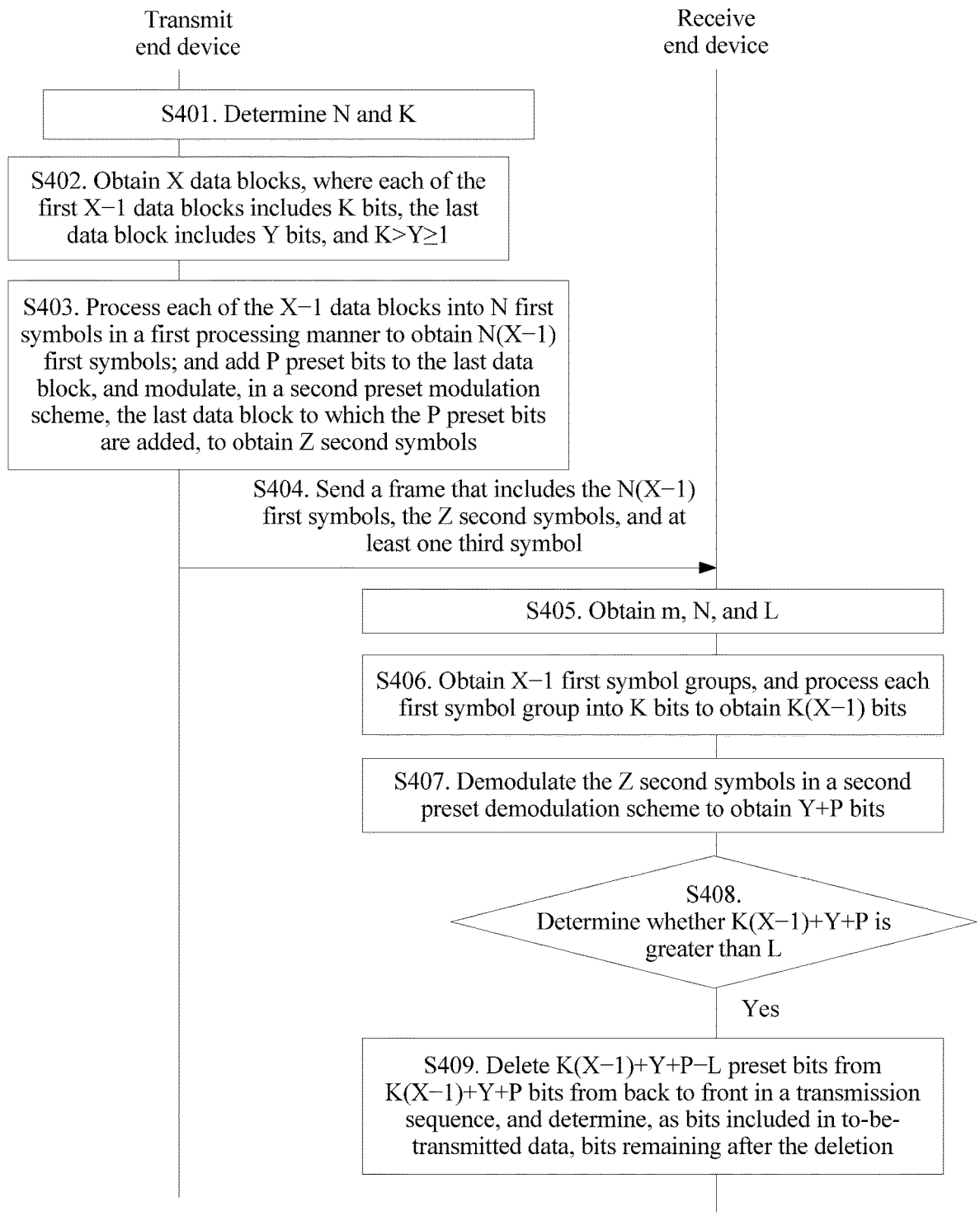
FIG. 4 is a schematic flowchart 2 of a data transmission method according to an embodiment of this application.

As shown in FIG. 4, a data transmission method provided in an embodiment of this application includes the following steps.

S401. When a preset condition is met, a transmit end device determines a quantity N of first symbols included in one first symbol group and a quantity K of bits transmitted in the first symbol group.

S401 in this embodiment is the same as S301 in the embodiment shown in FIG. 3, and details are not described herein again.

S402. The transmit end device obtains X data blocks, where each of the first X−1 data blocks in the X data blocks includes K bits, the last data block in the X data blocks includes Y bits, and K>Y≥1.

Further, the transmit end device groups to-be-transmitted data in a transmission sequence based on K to obtain the X data blocks.

For example, the to-be-transmitted data includes (X−1) K+Y bits. Based on the transmission sequence of the to-be-transmitted data, the transmit end device determines the first bit to the $K^{th}$ bit in the to-be-transmitted data as the first data block, and determines the $(K+1)^{th}$ bit to the $(2K)^{th}$ bit as the second data block. The to-be-transmitted data is grouped in this sequence until fewer than K bits remain, and the remaining bits are used as the last data block. For example, when m=6, N=2, and K=5, if the to-be-transmitted data is {01001011100110011101001}, the transmit end may obtain X=5 data blocks in a transmission sequence (from left to right) based on K=5, where the first four data blocks are {01001}, {01110}, {01100}, and {11101}, each including 5 bits, and the last data block is {001}, including 3 bits, in other words, Y=3.

In an embodiment implementation, the to-be-transmitted data in this embodiment of this application may be content in a frame header in a frame structure, or may be content in a payload in the frame structure, or may be content in the frame header and in the payload in the frame structure.

S403. The transmit end device processes each of the X−1 data blocks into N first symbols in a first processing manner to obtain N(X−1) first symbols; and the transmit end device adds P preset bits to the last data block, and modulates, in a second preset modulation scheme, the last data block to which the P bits are added, to obtain Z second symbols, where K−Y≥P≥1.

In this embodiment, for a process in which the transmit end device processes each of the X−1 data blocks into the N first symbols in the first processing manner, refer to the descriptions of S303. Details are not described herein again.

The second preset modulation scheme in this embodiment of this application may be any existing modulation scheme, such as UPWM modulation. A value of P corresponds to the second preset modulation scheme.

For example, if a modulation order m=6, N=2, K=5, to be specific, every 5 bits are one data block, a first preset mapping relationship is shown in Table 1, and the second preset modulation scheme is an existing 4-order UPWM modulation scheme. If a length of the to-be-transmitted data is 93 bits, the transmit end device divides the to-be-transmitted data into 19 data blocks, where each of the first 18 data blocks includes 5 bits, and the last data block includes 3 bits. The transmit end device maps each of the first 18 data blocks into two symbols based on the mapping relationship shown in Table 1, and adds 1 preset bit (for example, "0" or "1") to the last data block. In this way, the last data block to which the bit is added includes 4 bits in total, and the transmit end device modulates the data block into two 4-order UPWM symbols.

It may be learned that in this embodiment, a quantity of bits transmitted in the first symbol is different from a quantity of bits transmitted in the second symbol.

S404. The transmit end device sends, to a receive end device, a frame that includes the N(X−1) first symbols, the Z second symbols, and at least one third symbol.

After obtaining the N(X−1) first symbols and the Z second symbols, the transmit end device sends the N(X−1) first symbols and the Z second symbols to the receive end device. Further, the transmit end device sends, to the receive end device, the frame that includes the N(X−1) first symbols, the Z second symbols, and the at least one third symbol.

The N(X−1) first symbols and the Z second symbols in this embodiment of this application may be information included in the frame header, or may be information included in the payload, or may be information included in the frame header and in the payload.

The third symbol in this embodiment and the third symbol in S304 are the same, and both are obtained after the transmit end device modulates characteristic information in a first preset modulation scheme.

In this embodiment of this application, the first preset modulation scheme may be the same as or different from the second preset modulation scheme.

Different from S304, L included in the characteristic information in this embodiment is mandatory. The characteristic information in this embodiment includes L, N (optional), and m (optional). Same as the embodiment shown in FIG. 3, in this embodiment, a value of m may also be pre-agreed on by the transmit end device and the receive end device, and a value of N also remains unchanged.

Optionally, the characteristic information in this embodiment may further include second indication information and third indication information, the second indication information is used to indicate that each of the first X−1 data blocks is processed in the first processing manner, and the third indication information is used to indicate that the last data block is modulated in the second preset modulation scheme.

It should be noted that when the value of m is pre-agreed on by the transmit end device and the receive end device, and the value of N remains unchanged, the characteristic information in this embodiment may include only L, the second indication information, and the third indication information.

S405. The receive end device obtains the modulation order m used by the transmit end device, the quantity N of symbols included in one first symbol group, and the quantity L of bits included in the to-be-transmitted data sent by the transmit end device.

For a method for obtaining, by the receive end device, m and N in this embodiment, refer to the descriptions of S305 in the embodiment shown in FIG. 3. Details are not described herein again.

It may be learned from S404 that the characteristic information in this embodiment includes L such that the receive end device can obtain L from the characteristic information.

S406. The receive end device obtains X−1 first symbol groups, and processes each of the X−1 first symbol groups into K bits in a fifth processing manner to obtain K(X−1) bits.

Further, the receive end device groups the N(X−1) first symbols in a transmission sequence based on N to obtain the X−1 first symbol groups, where each of the X−1 first symbol groups includes N first symbols.

Optionally, when obtaining the X−1 first symbol groups, the receive end device may further determine X−1 through calculation based on m, N, L, the second indication information (optional), and the third indication information (optional).

For S406 in this embodiment, refer to the descriptions of S306 and S307 in the embodiment shown in FIG. 3.

Different from S306 and S307, there are X−1 first symbol groups in this embodiment, but there are X first symbol groups in S306 and S307.

S407. The receive end device demodulates the Z second symbols in a second preset demodulation scheme to obtain Y+P bits.

S408. The receive end device determines whether K(X−1)+Y+P is greater than L.

S409. If K(X−1)+Y+P is greater than L, the receive end device deletes K(X−1)+Y+P−L bits from K(X−1)+Y+P bits from back to front in a transmission sequence, and determines, as bits included in the to-be-transmitted data, bits remaining after the K(X−1)+Y+P−L bits are deleted.

The transmit end device processes each data block, where each data block includes K (K=$\lfloor \log_2 m^N \rfloor$) bits, and $\lfloor \log_2 m^N \rfloor$>N·$\lfloor \log_2 m \rfloor$. Therefore, in this embodiment of this application, a quantity of bits transmitted in each first symbol group sent by the transmit device is greater than a quantity of bits transmitted in N symbols in other approaches, thereby improving a data transmission rate and spectral efficiency.

The embodiments of this application are now described using an example in which a transmit end device processes each of the first X−1 data blocks in X data blocks in a first processing manner, and processes the last data block in the X data blocks in a second processing manner, where the first processing manner is the same as the second processing manner.

Figure 5:
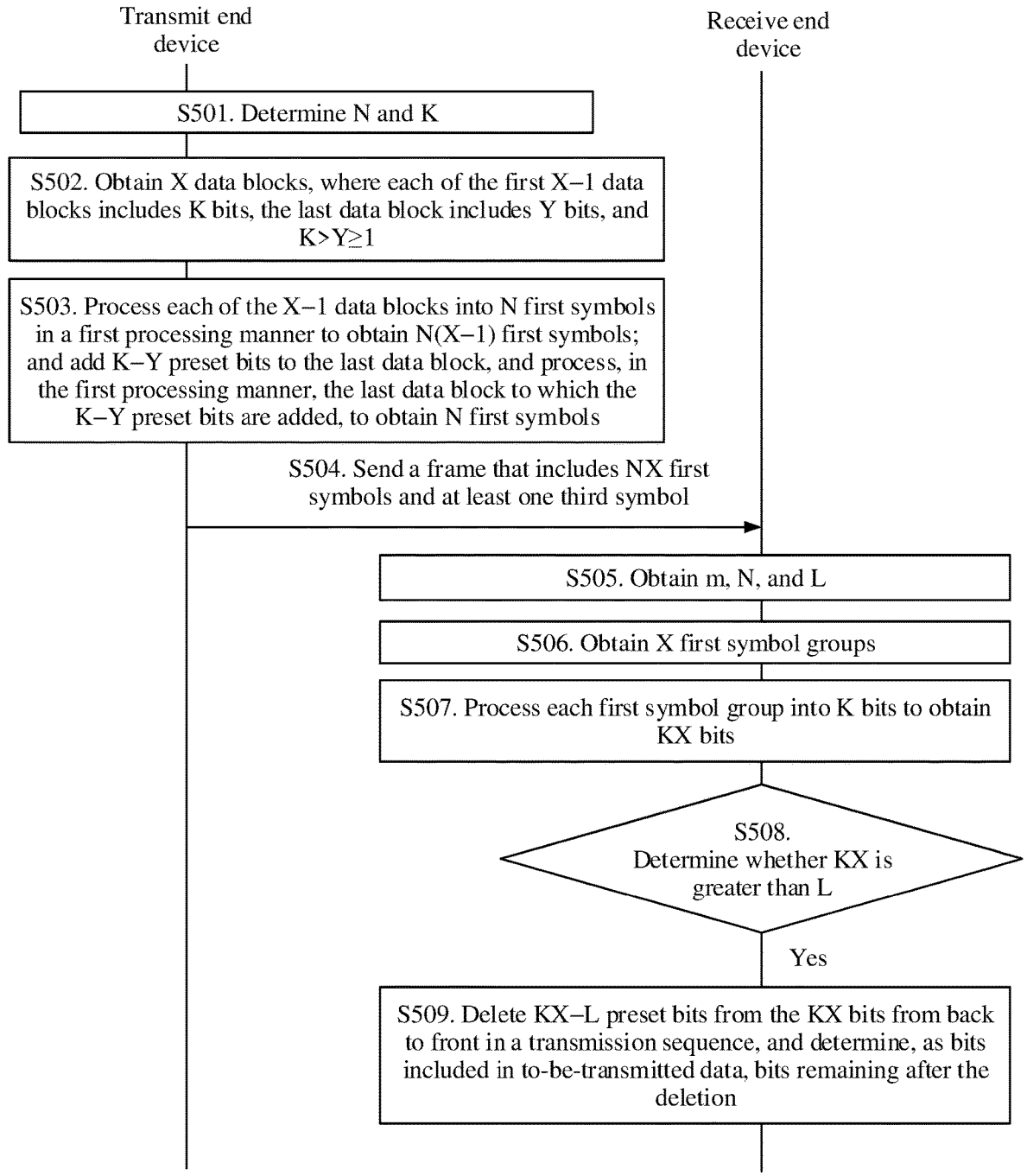
FIG. 5 is a schematic flowchart 3 of a data transmission method according to an embodiment of this application.

As shown in FIG. 5, a data transmission method provided in an embodiment of this application includes the following steps.

S501. When a preset condition is met, a transmit end device determines a quantity N of first symbols included in one first symbol group and a quantity K of bits transmitted in the first symbol group.

S502. The transmit end device obtains X data blocks, where each of the first X−1 data blocks in the X data blocks includes K bits, the last data block in the X data blocks includes Y bits, and K>Y≥1.

S501 and S502 in this embodiment are the same as S401 and S402 in the embodiment shown in FIG. 4, and details are not described herein again.

S503. The transmit end device processes each of the X−1 data blocks into N first symbols in a first processing manner to obtain N(X−1) first symbols; and the transmit end device adds K−Y preset bits to the last data block, and processes, in the first processing manner, the last data block to which the K−Y bits are added, to obtain N first symbols.

The transmit end device adds the K−Y preset bits to the last data block, and processes, in the first processing manner, the last data block to which the K−Y preset bits are added. In this way, with reference to the description that the transmit end device processes the first X−1 data blocks in the first processing manner, it may be learned that the transmit end device may obtain NX first symbols.

For a process in which the transmit end device processes the last data block to which the K−Y preset bits are added, refer to a process in which the transmit end device processes each of the X−1 data blocks. Details are not described herein again.

S504. The transmit end device sends, to a receive end device, a frame that includes the NX first symbols and at least one third symbol.

For S504 in this embodiment, refer to S304 in the embodiment shown in FIG. 3.

Same as the at least one third symbol in S304, the at least one third symbol in this embodiment is also obtained after the transmit end device modulates characteristic information in a first preset modulation scheme.

Different from S304, when a quantity L of bits included in to-be-transmitted data sent by the transmit end device is not a preset value, L included in the characteristic information in this embodiment is mandatory. In this way, the receive end device may determine, based on L, whether there is an extra bit. For a detailed process, refer to the following descriptions of S508 to S509.

S505. The receive end device obtains a modulation order m used by the transmit end device, the quantity N of symbols included in one first symbol group, and the quantity L of bits included in the to-be-transmitted data sent by the transmit end device.

S505 in this embodiment is the same as S405 in the embodiment shown in FIG. 4, and details are not described herein again.

S506. The receive end device obtains X first symbol groups.

S507. The receive end device processes each of the X first symbol groups into K bits in a fifth processing manner to obtain KX bits.

For S506 and S507 in this embodiment, refer to S306 and S307 in the embodiment shown in FIG. 3. Details are not described herein again.

S508. The receive end device determines whether KX is greater than L.

S509. If KX is greater than L, the receive end device deletes KX−L bits from the KX bits from back to front in a transmission sequence, and determines, as bits included in the to-be-transmitted data, bits remaining after the KX−L bits are deleted.

It may be considered that the embodiment shown in FIG. 3 is a special case in the embodiment shown in FIG. 5.

The transmit end device processes each data block, where each data block includes K ($K = \lfloor \log_2 m^N \rfloor$) bits, and $\lfloor \log_2 m^N \rfloor > N \cdot \lfloor \log_2 m \rfloor$. Therefore, in this embodiment of this application, a quantity of bits transmitted in each first symbol group sent by the transmit device is greater than a quantity of bits transmitted in N symbols in other approaches, thereby improving a data transmission rate.

Figure 6:
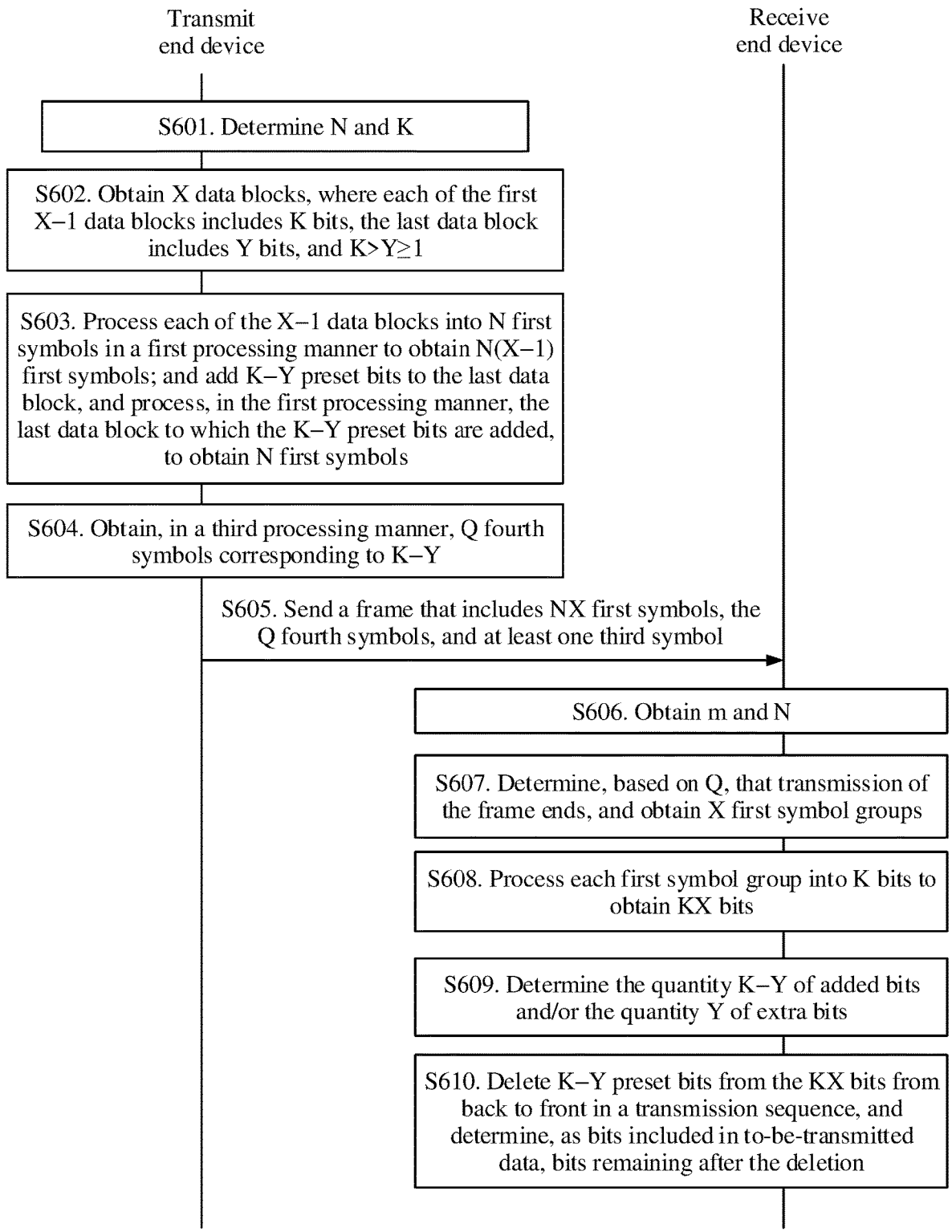
FIG. 6 is a schematic flowchart 4 of a data transmission method according to an embodiment of this application.

In a scenario in which a transmit end device processes each of the first X−1 data blocks in X data blocks in a first processing manner, and processes the last data block in the X data blocks in a second processing manner, where the first processing manner is the same as the second processing manner, as shown in FIG. 6, a data transmission method provided in an embodiment of this application may be as follows:

S601. When a preset condition is met, a transmit end device determines a quantity N of first symbols included in one first symbol group and a quantity K of bits transmitted in the first symbol group.

S602. The transmit end device obtains X data blocks, where each of the first X−1 data blocks in the X data blocks includes K bits, the last data block in the X data blocks includes Y bits, and K>Y≥1.

S603. The transmit end device processes each of the X−1 data blocks into N first symbols in a first processing manner to obtain N(X−1) first symbols; and the transmit end device adds K−Y preset bits to the last data block, and processes, in the first processing manner, the last data block to which the K−Y bits are added, to obtain N first symbols.

S601 to S603 in this embodiment are the same as S501 to S503 in the embodiment shown in FIG. 5, and details are not described herein again.

S604. The transmit end device obtains, in a third processing manner, Q fourth symbols corresponding to K−Y.

If $K-1 \leq m^N - 2^K$, Q=N.

Further, if $K-11 \leq m^N - 2^K$, the transmit end device obtains, based on a third preset mapping relationship, a third modulation parameter set corresponding to K−Y and/or Y, and generates N fourth symbols based on the obtained third modulation parameter set.

Herein, the third preset mapping relationship includes a one-to-one correspondence between K−1 different quantities of added bits and/or K−1 different quantities of extra bits and K−1 of $m^N$ different third modulation parameter sets. Each third modulation parameter set in the third preset mapping relationship includes N third modulation parameters, each third modulation parameter in each third parameter set is used to generate one fourth symbol, and the third modulation parameter set in the third preset mapping relationship is different from a first modulation parameter set in a first preset mapping relationship. The quantity of extra bits is used to indicate a quantity of bits includes in the last data block in the X data blocks.

Optionally, in this embodiment of this application, the third modulation parameter and a first modulation parameter are parameters of a same type. For example, when the first modulation parameter is duty cycle information and complementary duty cycle information, the third modulation parameter is also duty cycle information and complementary duty cycle information; or when the first modulation parameter is duty cycle information, the third modulation parameter is also duty cycle information.

For example, a modulation order m=6, the first preset mapping relationship is shown in Table 1, N=2, and K=5, to be specific, every 5 bits are one data block. There may be 1 extra bit, 2 extra bits, 3 extra bits, or 4 extra bits. The transmit end device respectively adds 4 preset bits, 3 preset bits, 2 preset bits, and 1 preset bit to the last data block, to meet a condition that the quantity K of bits of each data block is equal to 5. With reference to Table 1, it may be learned that when m=6, there are exactly four types of extra duty cycle information and complementary duty cycle information. Therefore, the transmit end device may only need to directly add two fourth symbols. Table 2 shows a third preset mapping relationship that represents a correspondence between a quantity of extra bits and a third modulation parameter set when m=6, N=2, and K=5. Table 3 shows a third preset mapping relationship that represents a correspondence between a quantity of added bits and a third modulation parameter set when m=6, N=2, and K=5.

TABLE 2

| Quantity (Y) of extra bits | Symbol I Duty cycle information (+complementary duty cycle information) | Symbol II Duty cycle information (+complementary duty cycle information) |
|---|---|---|
| 1 | 90% (+10%) | 45% (+55%) |
| 2 | 90% (+10%) | 60% (+40%) |
| 3 | 90% (+10%) | 75% (+25%) |
| 4 | 90% (+10%) | 90% (+10%) |

TABLE 3

| Quantity (K−Y) of added preset bits | Symbol I Duty cycle information (+complementary duty cycle information) | Symbol II Duty cycle information (+complementary duty cycle information) |
|---|---|---|
| 4 | 90% (+10%) | 45% (+55%) |
| 3 | 90% (+10%) | 60% (+40%) |
| 2 | 90% (+10%) | 75% (+25%) |
| 1 | 90% (+10%) | 90% (+10%) |

Certainly, the third modulation parameter in this embodiment of this application may alternatively include only the duty cycle information. After obtaining the duty cycle information, the transmit end device may obtain the complementary duty cycle information through calculation. The third modulation parameter may be alternatively another parameter that can be used to modulate a data block. This is not limited in this embodiment of this application.

If $K-1>m^K$, $Q=N \cdot i$ and $i \geq 1$.

Further, if $K-1>m^N-2^K$, the transmit end device obtains, based on a fourth preset mapping relationship, a fourth modulation parameter group corresponding to K−Y and/or Y, and generates Q fourth symbols based on the obtained fourth modulation parameter group.

Herein, the fourth preset mapping relationship includes a one-to-one correspondence between K−1 different quantities of added bits and/or K−1 different quantities of extra bits and K−1 of $m^N$ different fourth modulation parameter groups. Each fourth modulation parameter group in the fourth preset mapping relationship includes i fourth modulation parameter sets, and each fourth modulation parameter set is one of $m^N$ different fourth modulation parameter sets. Each fourth modulation parameter set includes N fourth modulation parameters, each fourth modulation parameter is used to generate one fourth symbol, each fourth modulation parameter group in the fourth preset mapping relationship includes at least one fourth modulation parameter set different from the first modulation parameter set in the first preset mapping relationship.

Fourth modulation parameter sets included in one fourth modulation parameter group may be completely different, or may be completely the same, or may not be completely the same. This is not limited in this embodiment of this application.

Optionally, the first modulation parameter set included in each fourth modulation parameter group in the fourth preset mapping relationship is different from the first modulation parameter set in the first preset mapping relationship.

Optionally, in this embodiment of this application, the fourth modulation parameter and the first modulation parameter are parameters of a same type. For example, when the first modulation parameter is duty cycle information and complementary duty cycle information, the fourth modulation parameter is also duty cycle information and complementary duty cycle information; or when the first modulation parameter is duty cycle information, the fourth modulation parameter is also duty cycle information.

For example, m=3, N=2, and K=3, to be specific, every 3 bits are one data block. If there is an extra bit, there may be 1 extra bit or 2 extra bits. The transmit end device respectively adds 2 preset bits and 1 preset bit, to meet a condition that the quantity K of bits of each data block is equal to 3. Table 4 shows a first preset mapping relationship in a case in which m=3, N=2, and K=3. It may be learned from Table 4 that when m=3, there is only one type of extra duty cycle information and complementary duty cycle information. Therefore, the transmit end device may add four fourth symbols. Table 5 shows a fourth preset mapping relationship that represents a correspondence between a quantity of extra bits and a fourth modulation parameter group when m=3, N=2, and K=3. In Table 5, when there are 2 extra bits, the fourth modulation parameter group includes two same fourth modulation parameter sets such as {80% (+20%), 80% (+20%)} and {80% (+20%), 80% (+20%)}.

Table 6 shows a fourth preset mapping relationship that represents a correspondence between a quantity of added preset bits and a fourth modulation parameter group when m=3, N=2, and K=3.

Certainly, the fourth modulation parameter in this embodiment of this application may alternatively include only the duty cycle information. After obtaining the duty cycle information, the transmit end device may obtain the complementary duty cycle information through calculation. The fourth modulation parameter may be alternatively another parameter that can be used to modulate a data block. This is not limited in this embodiment of this application.

TABLE 4

| Data block | Symbol I Duty cycle information (+complementary duty cycle information) | Symbol II Duty cycle information (+complementary duty cycle information) |
| --- | --- | --- |
| 000 | 20% (+80%) | 20% (+80%) |
| 001 | 20% (+80%) | 50% (+50%) |
| 010 | 20% (+80%) | 80% (+20%) |
| 011 | 50% (+50%) | 20% (+80%) |
| 100 | 50% (+50%) | 50% (+50%) |
| 101 | 50% (+50%) | 80% (+20%) |
| 110 | 80% (+20%) | 20% (+80%) |
| 111 | 80% (+20%) | 50% (+50%) |
| — | 80% (+20%) | 80% (+20%) |

TABLE 5

| Quantity (Y) of extra bits | Symbol I Duty cycle information (+complementary duty cycle information) | Symbol II Duty cycle information (+complementary duty cycle information) | Symbol III Duty cycle information (+complementary duty cycle information) | Symbol IV Duty cycle information (+complementary duty cycle information) |
| --- | --- | --- | --- | --- |
| 1 | 80% (+20%) | 80% (+20%) | — | — |
| 2 | 80% (+20%) | 80% (+20%) | 80% (+20%) | 80% (+20%) |

TABLE 6

| Quantity (K−Y) of added preset bits | Symbol I Duty cycle information (+complementary duty cycle information) | Symbol II Duty cycle information (+complementary duty cycle information) | Symbol III Duty cycle information (+complementary duty cycle information) | Symbol IV Duty cycle information (+complementary duty cycle information) |
| --- | --- | --- | --- | --- |
| 2 | 80% (+20%) | 80% (+20%) | — | — |
| 1 | 80% (+20%) | 80% (+20%) | 80% (+20%) | 80% (+20%) |

S605. The transmit end device sends, to a receive end device, a frame that includes NX first symbols, the Q fourth symbols, and at least one third symbol.

For S605 in this embodiment, refer to S304. A difference lies in that the frame in this embodiment further includes the Q fourth symbols.

Further, the Q fourth symbols are sent after the NX first symbols. The NX first symbols and the Q fourth symbols in this embodiment of this application may be information included in a frame header, or may be information included in a payload, or may be information included in the frame header and in the payload.

S606. The receive end device obtains the modulation order m used by the transmit end device and the quantity N of symbols included in one first symbol group.

S607. The receive end device determines, based on the Q fourth symbols, transmission of the frame sent by the transmit end device in S605 ends, and obtains X first symbol groups based on the received frame.

S608. The receive end device processes each of the X first symbol groups into K bits in a fifth processing manner to obtain KX bits.

For S606 to S608 in this embodiment, refer to S305 to S307. Details are not described herein again.

S609. The receive end device determines the quantity K−Y of added bits and/or the quantity Y of extra bits based on Q.

The receive end device determines, based on at least one of m, N, and K, that the receive end device determines the quantity Y of extra bits using a third preset mapping relationship or a fourth preset mapping relationship. Alternatively, the receive end device determines, based on at least one of m, N, and K, that the receive end device determines the quantity K−Y of added bits using the third preset mapping relationship or the fourth preset mapping relationship. Alternatively, the receive end device determines, based on at least one of m, N, and K, that the receive end device determines the quantity K−Y of added bits and the quantity Y of extra bits using the third preset mapping relationship or the fourth preset mapping relationship.

Herein, only by determining either of the quantity K−Y of added bits and the quantity Y of extra bits, the receive end device can correspondingly obtain the other one of the two quantities through calculation.

This embodiment is described using an example in which the receive end device determines the quantity K−Y of added bits.

If $K-1 \leq m^N - 2^K$, the receive end device determines to determine the quantity K−Y of added bits using the third preset mapping relationship. Further, the receive end device obtains a third demodulation parameter set corresponding to the Q fourth symbols, and determines the quantity K−Y of added bits based on the third preset mapping relationship. The third preset mapping relationship is the same as the third preset mapping relationship used by the transmit end device.

If $K-1 > m^2 - 2^K$, the receive end device determines to determine the quantity K−Y of added bits using the fourth preset mapping relationship. Further, the receive end device obtains a fourth demodulation parameter group corresponding to the Q fourth symbols, and determines the quantity K−Y of added bits based on the fourth preset mapping relationship. The fourth preset mapping relationship is the same as the fourth preset mapping relationship used by the transmit end device.

S610. The receive end device deletes K−Y bits from the KX bits from back to front in a transmission sequence, and determines, as bits included in to-be-transmitted data, bits remaining after the K−Y bits are deleted.

The transmit end device processes each data block, where each data block includes K ($K = \lfloor \log_2 m^N \rfloor$) bits, and $\lfloor \log_2 m^N \rfloor > N \cdot \lfloor \log_2 m \rfloor$. Therefore, in this embodiment of this application, a quantity of bits transmitted in each first symbol group sent by the transmit device is greater than a quantity of bits transmitted in N symbols in other approaches, thereby improving a data transmission rate and spectral efficiency.

Figure 7:
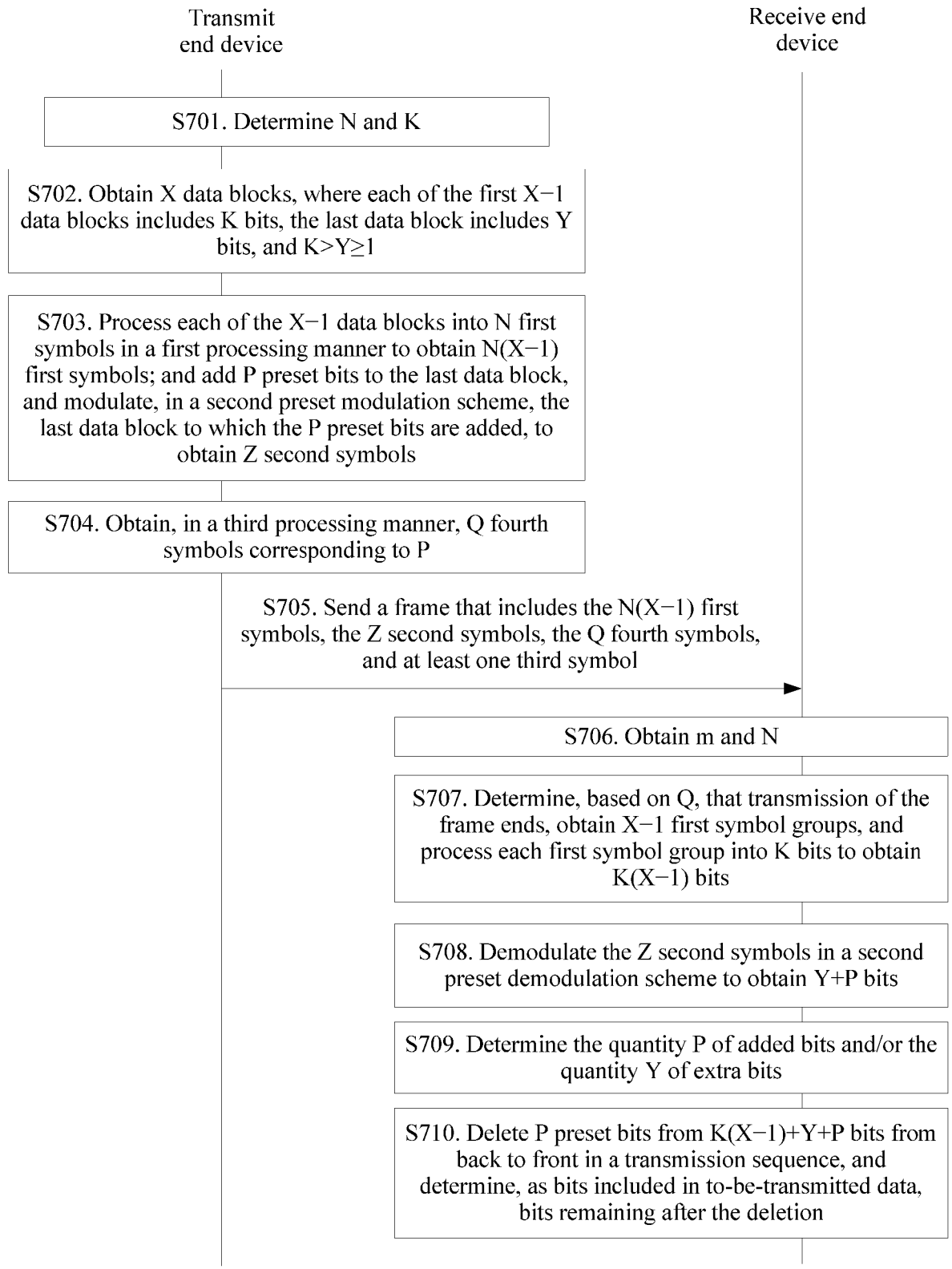
FIG. 7 is a schematic flowchart 5 of a data transmission method according to an embodiment of this application.

In a scenario in which a transmit end device processes each of the first X−1 data blocks in X data blocks in a first processing manner, and processes the last data block in the X data blocks in a second processing manner, where the second processing manner is a second preset modulation scheme, and the first processing manner is different from the second processing manner, as shown in FIG. 7, a data transmission method provided in an embodiment of this application may be as follows:

S701. When a preset condition is met, a transmit end device determines a quantity N of first symbols included in one first symbol group and a quantity K of bits transmitted in the first symbol group.

S702. The transmit end device obtains X data blocks, where each of the first X−1 data blocks in the X data blocks includes K bits, the last data block in the X data blocks includes Y bits, and K>Y≥1.

S703. The transmit end device processes each of the X−1 data blocks into N first symbols in a first processing manner to obtain N(X−1) first symbols; and the transmit end device adds P preset bits to the last data block, and processes, in a second processing manner, the last data block to which the P bits are added, to obtain Z second symbols, where K−Y≥P≥1.

For S701 to S703 in this embodiment, refer to S401 to S403 in the embodiment shown in FIG. 4. Details are not described herein again.

S704. The transmit end device obtains, in a third processing manner, Q fourth symbols corresponding to P.

For S704 in this embodiment, refer to S604 in the embodiment shown in FIG. 6. A difference lies in that there are P extra bits in this embodiment.

S705. The transmit end device sends, to a receive end device, a frame that includes the N(X−1) first symbols, the Z second symbols, the Q fourth symbols, and at least one third symbol.

For S705 in this embodiment, refer to S304. A difference lies in that the frame in this embodiment includes the N(X−1) first symbols, the Z second symbols, and the Q fourth symbols.

Further, the Q fourth symbols are sent after the N(X−1) first symbols and the Z second symbols. The N(X−1) first symbols, the Z second symbols, and the Q fourth symbols in this embodiment of this application may be information included in a frame header, or may be information included in a payload, or may be information included in the frame header and in the payload.

S706. The receive end device obtains a modulation order m used by the transmit end device and the quantity N of symbols included in one first symbol group.

For S706 in this embodiment, refer to S606. Details are not described herein again.

S707. The receive end device determines, based on the Q fourth symbols, that transmission of the frame sent by the transmit end device in S705 ends, obtains X−1 first symbol groups based on the received frame, and processes each of the X−1 first symbol groups into K bits in a fifth processing manner to obtain K(X−1) bits.

S708. The receive end device demodulates the Z second symbols in a second preset demodulation scheme to obtain Y+P bits.

For S707 and S708 in this embodiment, refer to the descriptions of S406 and S407. Details are not described herein again.

S709. The receive end device determines the quantity P of added bits and/or the quantity Y of extra bits based on Q.

For S709 in this embodiment, refer to the descriptions of S609. A difference lies in that there are P extra bits in this embodiment.

S710. The receive end device deletes P bits from K(X−1)+Y+P bits from back to front in a transmission sequence, and determines, as bits included in to-be-transmitted data, bits remaining after the P bits are deleted.

The transmit end device processes each data block, where each data block includes K (K=⌊ $\log_2 m^N$ ⌋ bits and ⌊ $\log_2 m^N$ ⌋>N·⌊ $\log_2 m$ ⌋. Therefore, in this embodiment of this application, a quantity of bits transmitted in each first symbol group sent by the transmit device is greater than a quantity of bits transmitted in N symbols in other approaches, thereby improving a data transmission rate and spectral efficiency.

An embodiment of this application provides a transmit end device, and the transmit end device is configured to perform the steps performed by the transmit end device in the foregoing data transmission method. The transmit end device provided in this embodiment of this application may include modules corresponding to the corresponding steps.

In this embodiment of this application, the transmit end device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. In this embodiment of this application, module division is an example and is merely logical function division, and may be other division in an embodiment implementation.

Figure 8:
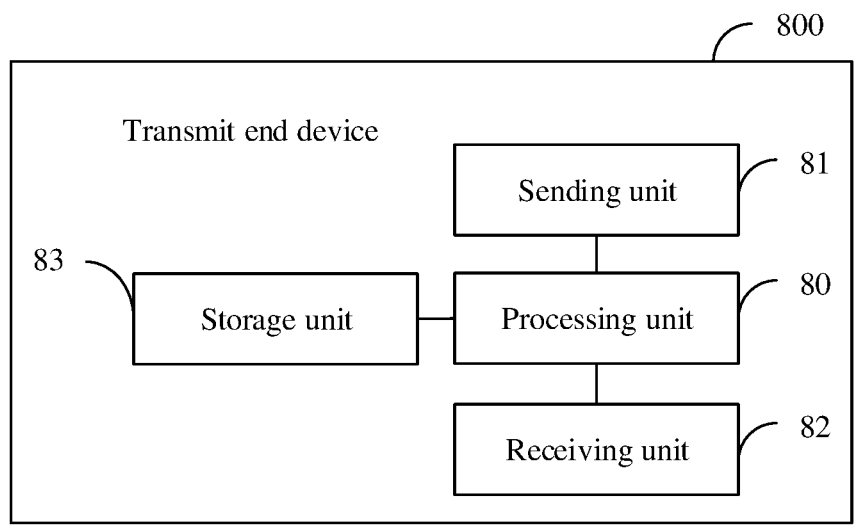
FIG. 8 is a schematic structural diagram of a transmit end device according to an embodiment of this application.

When each function module is obtained through division based on each corresponding function, FIG. 8 is a possible schematic structural diagram of the transmit end device in the foregoing embodiments. As shown in FIG. 8, a transmit end device 800 includes a processing unit 80 and a sending unit 81. The processing unit 80 is configured to support the transmit end device 800 in performing S401, S402, S403, S501, S502, S503, and the like in the foregoing embodiments, and/or is configured to perform another process of the technology described in this specification. The sending unit 81 is configured to support the transmit end device 800 in performing S404, S504, and the like in the foregoing embodiments, and/or is configured to perform another process of the technology described in this specification. All content related to the steps in the foregoing method embodiments may be cited in function descriptions of corresponding function modules. Details are not described herein. Certainly, the transmit end device 500 provided in this embodiment of this application includes but is not limited to the foregoing units. For example, the transmit end device 500 may further include a receiving unit 82 and a storage unit 53. The receiving unit 82 is configured to communicate with another device. The storage unit 53 may be configured to store a first preset mapping relationship, and may also be configured to store program code and data of the transmit end device.

When an integrated unit is used, in this embodiment of this application, the processing unit 80 may be the processor 21 in FIG. 2, the sending unit 81 and the receiving unit 82 may be antennas (not shown in FIG. 2), and the storage unit 83 may be the memory 23.

When the transmit end device 800 runs, the transmit end device 800 performs the data transmission method in the embodiment shown in any one of FIG. 3 to FIG. 7. For a specific data transmission method, refer to the related descriptions in the embodiment shown in any one of FIG. 3 to FIG. 7. Details are not described herein again.

Another embodiment of this application further provides a computer readable storage medium. The computer readable storage medium includes one or more pieces of program code. The one or more programs include an instruction. When the processor of the transmit end device 800 executes the program code, the transmit end device 800 executes the data transmission method shown in any one of FIG. 3 to FIG. 7.

In another embodiment of this application, a computer program product is further provided. The computer program product includes a computer executable instruction, and the computer executable instruction is stored in a computer readable storage medium. At least one processor of a transmit end device may read the computer executable instruction from the computer readable storage medium, and the at least one processor executes the computer executable instruction, to enable the transmit end device to implement the steps of the transmit end device in the data transmission method shown in any one of FIG. 3 to FIG. 7.

An embodiment of this application provides a receive end device, and the receive end device is configured to perform the steps performed by the receive end device in the foregoing data transmission method. The receive end device provided in this embodiment of this application may include modules corresponding to the corresponding steps.

In this embodiment of this application, the receive end device may be divided into unction modules based on the foregoing method examples. For example, each function module may be obtained through division based on each corresponding function, or two or more functions may be integrated into one processing module. The integrated module may be implemented in a form of hardware, or may be implemented in a form of a software function module. In this embodiment of this application, module division is an example and is merely logical function division, and may be other division in an embodiment implementation.

Figure 9:
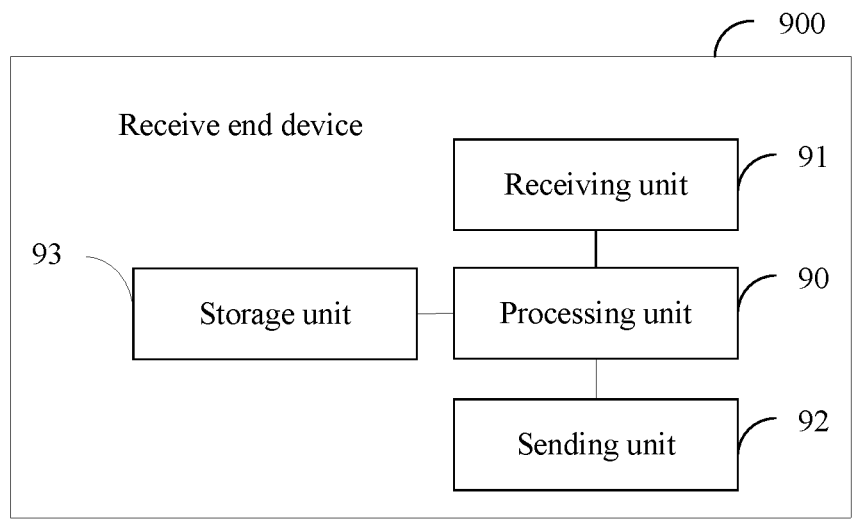
FIG. 9 is a schematic structural diagram of a receive end device according to an embodiment of this application.

When each function module is obtained through division based on each corresponding function, FIG. 9 is a possible schematic structural diagram of the receive end device in the foregoing embodiments. As shown in FIG. 9, a receive end device 900 includes a processing unit 90 and a receiving unit 91. The processing unit 90 is configured to support the receive end device 900 in performing S305, S306, S307, S405 to S409, and the like in the foregoing embodiments, and/or is configured to perform another process of the technology described in this specification. The receiving unit 91 is configured to support the receive end device 900 in performing S304, S404, and the like in the foregoing embodiments, and/or is configured to perform another process of the technology described in this specification. All content related to the steps in the foregoing method embodiments may be cited in function descriptions of corresponding function modules. Details are not described herein. Certainly, the receive end device 900 provided in this embodiment of this application includes but is not limited to the foregoing units. For example, the receive end device 900 may further include a sending unit 92 and a storage unit 93. The sending unit 92 is configured to communicate with another device. The storage unit 93 may be configured to store a first preset mapping relationship, and may also be configured to store program code and data of the receive end device.

When an integrated unit is used, in this embodiment of this application, the processing unit 90 may be the processor 21 in FIG. 2, the receiving unit 91 and the sending unit 92 may be antennas (not shown in FIG. 2), and the storage unit 93 may be the memory 23.

When the receive end device 900 runs, the receive end device 900 performs the data transmission method in the embodiment shown in any one of FIG. 3 to FIG. 7. For a specific data transmission method, refer to the related descriptions in the embodiment shown in any one of FIG. 3 to FIG. 7. Details are not described herein again.

Another embodiment of this application further provides a computer readable storage medium. The computer readable storage medium includes one or more pieces of program code. The one or more programs include an instruction. When the processor of the receive end device 900 executes the program code, the receive end device 900 executes the data transmission method shown in any one of FIG. 3 to FIG. 7.

In another embodiment of this application, a computer program product is further provided. The computer program product includes a computer executable instruction, and the computer executable instruction is stored in a computer readable storage medium. At least one processor of a receive end device may read the computer executable instruction from the computer readable storage medium, and the at least one processor executes the computer executable instruction, to enable the receive end device to implement the steps of the receive end device in the data transmission method shown in any one of FIG. 3 to FIG. 7.

Based on the foregoing descriptions of the implementations, a person skilled in the art may clearly understand that, for the purpose of convenient and brief description, division of the foregoing function modules is used as an example for description. In an embodiment application, the foregoing functions can be allocated to different function modules for implementation based on a requirement, to be specific, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the module or unit division is merely logical function division, and may be other division in an embodiment implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. Some or all of the units may be selected based on an actual requirement to achieve the objectives of the solutions of the embodiments.

In addition, the function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions of this application essentially, or the part contributing to other approaches, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the method described in the embodiments of this application. The storage medium includes any medium that can store program code, such as a flash memory, a removable hard disk, a read-only memory, a random access memory, a magnetic disk, or an optical disc.

The foregoing descriptions are merely specific implementations of this application, but the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A data transmission method, comprising:
    grouping to-be-transmitted data in a transmission sequence according to K bits, wherein K is a positive integer;
    obtaining X data blocks after the grouping, wherein first X−1 data blocks in the X data blocks comprise the K bits, wherein a last data block in the X data blocks comprises Y bits, wherein X and Y are positive integers, wherein X≥1, and wherein K≥Y≥1;
    processing each of the X data blocks into N first symbols in a first processing manner to obtain N*X first symbols; and
    sending the N*X first symbols to a receive end device, wherein N and K meet a preset condition where $\lfloor \log_2 m^N \rfloor > N \cdot \lfloor \log_2 m \rfloor$, and $K = \lfloor \log_2 m^N \rfloor$, wherein m is a modulation order, wherein m≥2, wherein N≥2, and wherein K≥3.

2. The data transmission method of claim 1, wherein the processing comprises:
    obtaining, based on a first preset mapping relationship, a first modulation parameter set that corresponds to each data block of the X data blocks; and
    generating the N first symbols based on the first modulation parameter set, wherein the first modulation parameter set comprises N first modulation parameters, wherein each first modulation parameter of the N first modulation parameters is used to generate a first symbol, and wherein the first preset mapping relationship comprises a one-to-one correspondence between $2^K$ different data blocks and $2^K$ of $m^N$ different first modulation parameter sets.

3. The data transmission method of claim 2, wherein when K>Y≥1, the processing comprises:
    processing each first X−1 data blocks into the N first symbols in the first processing manner;
    adding K−Y preset bits to the last data block in the X data blocks; and
    processing, into the N first symbols in the first processing manner, the last data block after the adding.

4. The data transmission method of claim 3, wherein after processing, into the N first symbols in the first processing manner, the last data block after the adding, the data transmission method further comprises obtaining, in a second processing manner, N second symbols that correspond to K−Y or Y when $K-1 \leq m^N - 2^K$, and wherein the sending further comprises sending the NX first symbols and the N second symbols to the receive end device, wherein the N second symbols are sent after sending the NX first symbols.

5. The data transmission method of claim 4, wherein obtaining, in the second processing manner, the N second symbols that correspond to K−Y or Y comprises:
   obtaining, based on a second preset mapping relationship, a second modulation parameter set that corresponds to K−Y or Y, wherein the second modulation parameter set comprises N second modulation parameters, wherein each second modulation parameter of the N second modulation parameters generates a second symbol, wherein the second preset mapping relationship comprises a one-to-one correspondence between K−1 different quantities of added bits or K−1 different quantities of extra bits and K−1 of $m^N$ different second modulation parameter sets, wherein the second modulation parameter set in the second preset mapping relationship is different from the first modulation parameter set in the first preset mapping relationship, and wherein the K−1 different quantities of extra bits is a quantity of bits comprised in the last data block in the X data blocks; and
   generating the N second symbols based on the second modulation parameter set that corresponds to K−Y or Y.

6. The data transmission method of claim 3, wherein after processing, into the N first symbols in the first processing manner, the last data block after the adding, the data transmission method further comprises obtaining, in a third processing manner, Q third symbols that correspond to K−Y or Y when K−1>$m^N 2^K$, wherein Q=N·i and i≥1, wherein the sending further comprises sending the NX first symbols and the Q third symbols to the receive end device, and wherein the Q third symbols are sent after sending Z second symbols, wherein Z≥1.

7. The data transmission method of claim 6, wherein obtaining, in the third processing manner, the Q third symbols that correspond to K−Y or Y comprises:
   obtaining, based on a third preset mapping relationship, a third modulation parameter group that corresponds to of K−Y or Y, wherein the third preset mapping relationship comprises a one-to-one correspondence between K−1 different quantities of added bits or K−1 different quantities of extra bits and K−1 different third modulation parameter groups, wherein each of the third modulation parameter groups comprises i third modulation parameter sets, wherein each third modulation parameter set is one of $m^N$ different third modulation parameter sets, wherein each third modulation parameter set comprises N third modulation parameters, wherein each of the N third modulation parameters is used to generate a third symbol, wherein each of the third modulation parameter groups in the third preset mapping relationship comprises at least one fourth modulation parameter set different from the first modulation parameter set in the first preset mapping relationship, and wherein the K−1 different quantities of extra bits is a quantity of bits comprised in the last data block in the X data blocks; and
   generating the Q third symbols based on the third modulation parameter group that corresponds to K−Y or Y.

8. The data transmission method of claim 1, wherein the sending comprises sending a frame to the receive end device, wherein the frame comprises the NX first symbols and at least one third symbol, wherein the at least one third symbol is obtained after characteristic information is modulated in a first preset modulation scheme, wherein the characteristic information comprises at least one of N, m, or a quantity L of bits comprised in the to-be-transmitted data, and wherein L is an integer.

9. A data transmission method, comprising:
   receiving a frame from a transmit end device, wherein the frame comprises N*X first symbols;
   obtaining a modulation order m for the transmit end device and a quantity N of symbols comprised in a first symbol group, wherein m≥2, wherein N and X are positive integers;
   obtaining X first symbol groups; and
   processing each of the X first symbol groups into K bits in a first processing manner to obtain KX bits, wherein K≥3, wherein each of the X first symbol groups comprises N first symbols, wherein the X first symbol groups are obtained after the N*X first symbols are grouped in a transmission sequence based on N, and wherein the first processing manner is based on m.

10. The data transmission method of claim 9, further comprising:
    obtaining a quantity L of bits comprised in to-be-transmitted data, wherein the to-be-transmitted data is comprised in the frame, wherein L≥2 and wherein after the processing, the data transmission method further comprises:
    determining whether K*X is greater than L; and
    deleting KX−L bits from the KX bits from back to front in a transmission sequence when K*X is greater than L; and
    determining, as bits comprised in the to-be-transmitted data, bits remaining after the K*X−L bits are deleted when K*X is greater than L.

11. The data transmission method of claim 9, wherein the frame further comprises N second symbols, and wherein the data transmission method further comprises:
    determining, based on the N second symbols, that transmission of the frame ends;
    obtaining a first demodulation parameter set that corresponds to the N second symbols, wherein the first demodulation parameter set comprises N first demodulation parameters, wherein each first demodulation parameter is used to demodulate one of the N second symbols;
    determining, based on a first preset mapping relationship, a K−Y of added bits or a quantity Y of extra bits that correspond to the first demodulation parameter set, wherein the first preset mapping relationship comprises a one-to-one correspondence between K−1 different quantities of added bits or K−1 different quantities of extra bits and K−1 of $m^N$ different one of the first demodulation parameter set, wherein the K−1 different quantities of extra bits is a quantity of bits comprised in a last data block in X data blocks, and wherein K≥Y≥1;
    deleting K−Y bits from the K*X bits from back to front in a transmission sequence after the processing; and
    determining, as bits comprised in to-be-transmitted data, bits remaining after the quantity of K−Y bits are deleted after the processing.

12. A transmit end device, comprising:
    a processor configured to:
    group to-be-transmitted data in a transmission sequence according to K bits, wherein K is a positive integer;
    obtain X data blocks after the grouping, wherein X−1 data blocks in the X data blocks comprise the K bits, wherein a last data block in the X data blocks comprises Y bits, wherein X and Y are integers, wherein X≥1, and wherein K≥Y≥1; and process each of the X data blocks into N first symbols in a first processing manner to obtain N*X first symbols, wherein N and K meets a preset condition that $\lfloor \log_2 m^N \rfloor > N \cdot \lfloor \log_2 m \rfloor$, $K = \lfloor \log_2 m^N \rfloor$, wherein m is a modulation order, wherein m≥2, wherein N≥2, and wherein K≥3;

a transmitter coupled to the processor and configured to:

send the N*X first symbols to a receive end device after the processor obtains the NX first symbols; or send the N(X−1) first symbols and the Z second symbols to the receive end device after the processor obtains the N(X−1) first symbols and Z second symbols, wherein Z≥1.

13. The transmit end device of claim 12, wherein for each of the X data blocks, the processor is configured to:

obtain, based on a first preset mapping relationship, a first modulation parameter set that corresponds to each data block of the X data blocks; and generate the N first symbols based on the first modulation parameter set, wherein the first modulation parameter set comprises N first modulation parameters, wherein each of the N first modulation parameters is used to generate a first symbol, and wherein the first preset mapping relationship comprises a one-to-one correspondence between $2^K$ different data blocks and $2^K$ of $m^N$ different first modulation parameter sets.

14. The transmit end device of claim 13, wherein when K>Y≥1, the processor is configured to:

process each first X−1 data blocks in the X data blocks into the N first symbols in the first processing manner;

add K−Y preset bits to the last data block in the X data blocks; and process, into the N first symbols in the first processing manner, the last data block after the adding.

15. The transmit end device of claim 14, wherein the processor is further configured to:

after processing, into the N first symbols in the first processing manner, the last data block after the adding, either obtain, in a second processing manner, N second symbols that correspond to K−Y or Y when $K-1 \leq m^N - 2^K$, wherein the sending unit transmitter is further configured to send the N*X first symbols and the N second symbols to the receive end device, and wherein the N second symbols are sent after sending the N*X first symbols; or after processing, into the N first symbols in the first processing manner, the last data block after the adding, obtain, in a third processing manner, Q third symbols that correspond to K−Y or Y when $K-1 \circ m^N - 2^K$, wherein Q=N·i and i≥1, wherein the transmitter is further configured to send the NX first symbols and the Q third symbols to the receive end device, and wherein the Q third symbols are sent after sending Z second symbols, wherein Z≥1.

16. The transmit end device of claim 15, wherein the processor is further configured to:

either (a) obtain, based on a second preset mapping relationship, a second modulation parameter set that corresponds to K−Y or Y, wherein the second modulation parameter set comprises N second modulation parameters, wherein each second modulation parameter of the N second modulation parameters is used to generate a second symbol, wherein the second preset mapping relationship comprises a one-to-one correspondence between K−1 different quantities of added bits or K−1 different quantities of extra bits and K−1 of $m^N$ different second modulation parameter sets, wherein the second modulation parameter set in the second preset mapping relationship is different from the first modulation parameter set in the first preset mapping relationship, and wherein the K−1 different quantities of extra bits is a quantity of bits comprised in the last data block in the X data blocks; and generate the N second symbols based on the second modulation parameter set that corresponds to K−Y or Y; or (b) obtain, based on a third preset mapping relationship, a third modulation parameter group that corresponds to K−Y or Y, wherein the third preset mapping relationship comprises a one-to-one correspondence between K−1 different quantities of added bits or K−1 different quantities of extra bits and K−1 different third modulation parameter groups, wherein each of the third modulation parameter groups comprises i third modulation parameter sets, wherein each third modulation parameter set is one of $m^N$ different third modulation parameter sets, wherein each of the third modulation parameter sets comprises N third modulation parameters, wherein each of the N third modulation parameters is used to generate one fourth a third symbol, wherein each of the third modulation parameter groups in the third preset mapping relationship comprises at least one fourth modulation parameter set different from the first modulation parameter set in the first preset mapping relationship, and wherein the K−1 different quantities of extra bits is a quantity of bits comprised in the last data block in the X data blocks; and generate the Q third symbols based on the third modulation parameter set that corresponds to K−Y or Y.

17. The transmit end device of claim 12, wherein the transmitter is further configured to send a frame to the receive end device after the processor obtains the N*X first symbols, wherein the frame comprises the N*X first symbols and at least one third symbol, wherein the at least one third symbol is obtained after characteristic information is modulated in a first preset modulation scheme, wherein the characteristic information comprises at least one of N, m, or a quantity L of bits comprised in the to-be-transmitted data, and wherein L is an integer.

18. The transmit end device of claim 12, wherein the processor is further configured to:

obtain, based on a first preset mapping relationship, a first modulation parameter set that corresponds to a data block of each of the first X−1 data blocks in the X data blocks;

generate the N first symbols based on the first modulation parameter set, wherein the first modulation parameter set comprises N first modulation parameters, wherein each of the N first modulation parameters is used to generate a first symbol, and wherein the first preset mapping relationship comprises a one-to-one correspondence between $2^K$ different data blocks and $2^K$ of $m^N$ different first modulation parameter sets;

obtain, based on a second preset mapping relationship, a second modulation parameter set that corresponds to the last data block; and either generate the Z second symbols based on the second modulation parameter set, wherein the second modulation parameter set comprises Z second modulation parameters, wherein each of the Z second modulation parameters is used to generate a second symbol, and wherein the second preset mapping relationship comprises a correspondence between the last data block and the second modulation parameter set; or modulate the last data block into the Z second symbols in a second preset modulation scheme.

19. A receive end device, comprising:

a receiver configured to receive a frame from a transmit end device, wherein the frame comprises N*X first symbols; and a processor coupled to the receiver and configured to:

obtain a modulation order m used by the transmit end device and a quantity N of symbols comprised in a first symbol group, wherein m≥2, wherein N and X are positive integers;

obtain X first symbol groups; and process each of the X first symbol groups into K bits in a first processing manner to obtain K*X bits, wherein K≥3, wherein each of the X first symbol groups comprises N first symbols, wherein the X first symbol groups are obtained after the N*X first symbols are grouped in a transmission sequence based on N, and wherein the first processing manner is based on m.

20. The receive end device of claim 19, wherein the processor is further configured to:

obtain a quantity L of bits comprised in to-be-transmitted data, wherein the to-be-transmitted data is comprised in the frame, wherein L≥2;

determine whether KX is greater than L after obtaining the K*X bits;

delete K*X−L bits from the K*X bits from back to front in a transmission sequence when determining that K*X is greater than L; and determine, as bits comprised in the to-be-transmitted data, bits remaining after the K*X−L bits are deleted when determining that KX is greater than L.

* * * * *

UNITED STATES PATENT AND TRADEMARK OFFICE
CERTIFICATE OF CORRECTION

PATENT NO. : 10,897,312 B2  
APPLICATION NO. : 16/692595  
DATED : January 19, 2021  
INVENTOR(S) : Jiang et al.

Page 1 of 1

It is certified that error appears in the above-identified patent and that said Letters Patent is hereby corrected as shown below:

In the Claims

Claim 1, Column 38, Line 36: "[$\log_2$ m], and K=" should read "[$\log_2$ m] and K="

Claim 15, Column 41, Line 43: "wherein the sending unit transmitter" should read "wherein the transmitter"

Claim 15, Column 41, Line 51: "when K-1°$m^N$-$2^K$" should read "when K-1>$m^N$-$2^K$"

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*